(12) United States Patent
Jeon et al.

(10) Patent No.: US 11,570,446 B2
(45) Date of Patent: **\*Jan. 31, 2023**

(54) INTER PREDICTION METHOD AND APPARATUS THEREFOR

(71) Applicant: LG Electronics Inc., Seoul (KR)

(72) Inventors: Yongjoon Jeon, Seoul (KR); Seungwook Park, Seoul (KR); Jaehyun Lim, Seoul (KR); Chulkeun Kim, Seoul (KR); Jungsun Kim, Seoul (KR); Naeri Park, Seoul (KR); Hendry Hendry, Seoul (KR); Byeongmoon Jeon, Seoul (KR); Joonyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,604

(22) Filed: Jun. 29, 2021

(65) Prior Publication Data

US 2021/0329260 A1    Oct. 21, 2021

Related U.S. Application Data

(63) Continuation of application No. 16/814,808, filed on Mar. 10, 2020, now Pat. No. 11,082,704, which is a
(Continued)

(51) Int. Cl.
*H04N 19/159* (2014.01)
*H04N 19/52* (2014.01)
(Continued)

(52) U.S. Cl.
CPC ........... *H04N 19/159* (2014.11); *H04N 19/43* (2014.11); *H04N 19/436* (2014.11); *H04N 19/52* (2014.11);
(Continued)

(58) Field of Classification Search
CPC ...... H04N 7/50; H04N 7/462; H04N 7/26244; H04N 7/26335; H04N 7/26941;
(Continued)

(56) References Cited

U.S. PATENT DOCUMENTS 5,960,119 A    9/1999 Echigo
7,978,919 B2   7/2011 Zhang
(Continued)

FOREIGN PATENT DOCUMENTS

CN    1756361    4/2006
CN    1933600    3/2007
(Continued)

OTHER PUBLICATIONS

Bross et al., "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Meeting #6, Torino, IT, dated Jul. 14-22, 2011, 228 pages.
(Continued)

*Primary Examiner* — Shawn S An
(74) *Attorney, Agent, or Firm* — Fish & Richardson P.C.

(57) ABSTRACT

According to the present invention, an inter prediction method comprises the steps of: generating a merge candidate list for a block to be predicted, wherein the block is to correspond to a current prediction unit; deriving, on the basis of one of a plurality of merge candidates constituting the merge candidate list, motion information on the block to be predicted; and performing, on the basis of the derived motion information, a prediction on the block to be predicted so as to generate a prediction block corresponding to the current prediction unit.

8 Claims, 24 Drawing Sheets

Related U.S. Application Data continuation of application No. 16/173,825, filed on Oct. 29, 2018, now Pat. No. 10,652,551, which is a continuation of application No. 15/463,021, filed on Mar. 20, 2017, now Pat. No. 10,116,941, which is a continuation of application No. 14/343,882, filed as application No. PCT/KR2012/007224 on Sep. 7, 2012, now Pat. No. 9,621,888.

(60) Provisional application No. 61/532,562, filed on Sep. 9, 2011, provisional application No. 61/540,543, filed on Sep. 29, 2011, provisional application No. 61/557,337, filed on Nov. 8, 2011, provisional application No. 61/557,861, filed on Nov. 9, 2011, provisional application No. 61/563,817, filed on Nov. 27, 2011, provisional application No. 61/578,832, filed on Dec. 21, 2011, provisional application No. 61/583,622, filed on Jan. 6, 2012, provisional application No. 61/585,654, filed on Jan. 12, 2012.

(51) Int. Cl.
*H04N 19/43* (2014.01)
*H04N 19/436* (2014.01)
*H04N 19/57* (2014.01)
*H04N 19/105* (2014.01)
*H04N 19/176* (2014.01)

(52) U.S. Cl.
CPC ........... *H04N 19/57* (2014.11); *H04N 19/105* (2014.11); *H04N 19/176* (2014.11)

(58) Field of Classification Search
CPC .... H04N 19/159; H04N 19/52; H04N 19/436; H04N 19/57; H04N 19/43
See application file for complete search history.

(56) References Cited

U.S. PATENT DOCUMENTS

| | | | | |
|---|---|---|---|---|
| 9,621,888 | B2* | 4/2017 | Jeon | H04N 19/52 |
| 10,116,941 | B2* | 10/2018 | Jeon | H04N 19/159 |
| 10,652,551 | B2* | 5/2020 | Jeon | H04N 19/436 |
| 11,082,704 | B2* | 8/2021 | Jeon | H04N 19/52 |
| 2005/0058206 | A1 | 3/2005 | Lim et al. | |
| 2006/0067400 | A1 | 3/2006 | Zhang | |
| 2011/0150095 | A1 | 6/2011 | Choi et al. | |
| 2012/0230408 | A1* | 9/2012 | Zhou | H04N 19/105 |
| | | | | 375/E7.125 |
| 2012/0257678 | A1* | 10/2012 | Zhou | H04N 19/56 |
| | | | | 375/E7.243 |
| 2012/0307902 | A1 | 12/2012 | Sugio et al. | |
| 2013/0101042 | A1* | 4/2013 | Sugio | H04N 19/52 |
| | | | | 375/E7.123 |
| 2013/0107959 | A1* | 5/2013 | Park | H04N 19/61 |
| | | | | 375/240.15 |
| 2013/0128978 | A1* | 5/2013 | Yie | H04N 19/176 |
| | | | | 375/240.12 |
| 2014/0301461 | A1* | 10/2014 | Jeon | H04N 19/43 |
| | | | | 375/240.12 |
| 2014/0341284 | A1* | 11/2014 | Kim | H04N 19/124 |
| | | | | 375/240.12 |
| 2015/0237370 | A1 | 8/2015 | Zhou et al. | |

FOREIGN PATENT DOCUMENTS

| | | |
|---|---|---|
| CN | 101026761 | 8/2007 |
| CN | 101268698 | 9/2008 |
| CN | 101379829 | 3/2009 |
| JP | 09-0084052 | 3/1997 |
| JP | 2008154072 | 7/2008 |
| JP | 2010524397 | 7/2010 |
| JP | 2014529254 | 10/2014 |
| JP | 2014533059 | 12/2014 |
| KR | 1020060028848 | 4/2006 |
| KR | 10-1033243 | 5/2011 |
| KR | 1020110073257 | 6/2011 |
| WO | WO2013036071 | 3/2013 |
| WO | WO2013070001 | 5/2013 |

OTHER PUBLICATIONS

Etri and Kyung Hee University, "CU-based Merge Candidate List Construction", JCTVC-G416, Joint Collaborative Team on Video Coding (JCT-VC) of ITU-T SG16 WP3 and ISO/IEC JTC1/SC29/WG11, Geneva, dated Nov. 21-30, 2011, 13 pages.
European Search Report in European Appln. No. 18209458.1, dated Feb. 15, 2019, 9 pages.
International Search Report dated Feb. 13, 2013 for Application No. PCT/KR.2012/007224, with English Translation, 4 pages.
Japanese Office Action in Japanese Appln. No. 2014-529620, dated Jan. 12, 2016, 4 pages (with English translation).
Japanese Office Action in Japanese Appln. No. 2019-119980, dated Aug. 18, 2020, 4 pages (with English translation).
Jeon et al., "AHG 10: Unified design on parallel merge/skip", Joint Collaborative Team on Video Coding (JCT-VC) of ITU-T SG16 WP3 and ISO/IEC JTCI/SC29/WGJ 1, 8th Meeting: San Jose, CA, USA, Feb. 1-10, 2012, Document JCTVC-H0090 (XP030051487), 10 pages.
Jeon et al., "11Non-CE9: improvement on parallelized merge/skip mode", Joint Collaborative Team on Video Coding (JCT-VC) ofITU-T SG16 WP3 and ISO/IEC JTC1/SC29/WG11, 7th Meeting: Geneva, CH, Nov. 19-30, 2011, Document: JCTVC-G 164 (XP03b 110148), 7 pages.
Kim et al., "AHG 10: Unified design on parallel merge/skip with reduced candidates", Joint Collaborative Team on Video Coding (JCT-VC) ofITU-T SG16 WP3 and ISO/IEC JTC1/SC29/WG11, 8th Meeting: San Jose, CA, USA, Feb. 1-10, 2012, Document JCTVCH0247 (XP030051647), 7 pages.
Kim et al., "CU-based Merge Candidate List Construction", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document JCTVC-G416 (XP030110400), 13 pages.
Kim et al., "CU-based Merge Candidate List Construction," JCTVC-G416, Joint Collaborative Team on Video Coding (JCT-VC) of ITU-T SG16 WP3 and ISO/IEC JTC1/SC29/WG11, 7th Meeting: Geneva, Nov. 21-30, 2011, 13 pages.
Li et al., "Redundancy reduction in Cbf and Merging coding," Collaborative Team on Video Coding (JCT-VC) ofITU-T SG 16 WP3 and ISO/IEC JTC1/SC29/WG 11, 3rd Meeting: Guangzhou, CN, Oct. 7-15, 2010, Document: JCTVC-C277, 8 pages.
Office Action dated Mar. 24, 2015 for JP Application No. 2014-529620, 4 pages (No Translation).
Samsung Electronics Co., Ltd. and Texas Instruments, "Experiments on tools in Working Daft (WD) and HEVC Test Mode (HM-3.0)", JCTVC-F465, Joint Collaborative Team on Video Coding (JCT-VC) of ITU-T SG16 WP3 and ISO/IEC JTC1/SC29/WG11, Torino, dated Jul. 14-22, 2011, 12 pages.
Supplementary European Search Report dated Mar. 12, 2015 for EP Application No. 12829697.7, 11 pages.
Wen et al., "Parallel Merge/skip Mode for HEVC", Joint Collaborative Team on Video Coding (JCT-VC) ofITU-T SG 16 WP3 and ISO/IEC JTC1/SC29/WG 11, 7th Meeting: Geneva, CH, Nov. 21-30, 2011, Document JCTVC-G387 (XP030050512), 13 pages.
Zhou, "Parallelized merge/skip mode for HEVC", Joint Collaborative Team on Video Coding (JCT-VC) of ITU-T SG16 WP3 and ISO/IEC JTC1/SC29/WG 11, 6th Meeting: Torino, IT, Jul. 14-22, 2011, Document JCTVC-F069, 13 pages.

\* cited by examiner

INTER PREDICTION METHOD AND APPARATUS THEREFOR

CROSS REFERENCE TO RELATED APPLICATIONS

This application is a continuation of U.S. application Ser. No. 16/814,808, filed on Mar. 10, 2020, which is a continuation of U.S. application Ser. No. 16/173,825, filed on Oct. 29, 2018, now U.S. Pat. No. 10,652,551, which is a continuation of U.S. application Ser. No. 15/463,021, filed Mar. 20, 2017, now U.S. Pat. No. 10,116,941, which is a continuation of U.S. application Ser. No. 14/343,882, filed May 30, 2014, now U.S. Pat. No. 9,621,888, which is a U.S. National Phase Application of International Application PCT/KR2012/007224, filed on Sep. 7, 2012, which claims the benefit of U.S. Provisional Application No. 61/532,562, filed on Sep. 9, 2011, U.S. Provisional Application No. 61/540,543, filed on Sep. 29, 2011, U.S. Provisional Application No. 61/557,337, filed on Nov. 8, 2011, U.S. Provisional Application No. 61/557,861, filed on Nov. 9, 2011, U.S. Provisional Application No. 61/563,817, filed on Nov. 27, 2011, U.S. Provisional Application No. 61/578,832, filed on Dec. 21, 2011, U.S. Provisional Application No. 61/583,622, filed on Jan. 6, 2012, and U.S. Provisional Application No. 61/585,654, filed on Jan. 12, 2012, and the entire contents of the prior applications are hereby incorporated by reference in their entirety.

TECHNICAL FIELD

The present invention relates to image processing, and more particularly, to an inter prediction method and apparatus.

BACKGROUND ART

Recently, there is a growing demand for images with high resolution and high quality such as high definition (HD) videos and ultra high definition (UHD) videos in various fields. In comparison with the existing image data, high resolution and high quality image data requires a relatively great information amount or bit amount. Therefore, a transmission cost and a storage cost are increased when the image data is transmitted by using a medium such as the existing wired/wireless broadband line or when the image data is stored by using the existing storage medium. To solve these problems, high-efficient image compression techniques may be used.

As the video compression technique, there are various techniques such as an inter prediction technique which predicts a pixel value included in a current picture from a previous and/or next picture of the current picture, an intra prediction technique which predicts a pixel value included in a current picture by using pixel information in the current picture, an entropy encoding technique which allocates a short codeword to a value having a high appearance frequency and allocates a long codeword to a value having a low appearance frequency, etc. Such an image compression technique may be used to transmit or store image data by effectively compressing the image data.

SUMMARY OF INVENTION

Technical Problem

The present invention provides a method and apparatus for video coding capable of decreasing a complexity and improving an encoding/decoding efficiency.

The present invention also provides a video decoding method and apparatus capable of decreasing a complexity and improving an encoding/decoding efficiency.

The present invention also provides an inter prediction method and apparatus capable of decreasing a complexity and improving an encoding/decoding efficiency.

The present invention also provides a merging candidate list generation method and apparatus capable of decreasing a complexity and improving an encoding/decoding efficiency.

Technical Solution

According to an aspect of the present invention, there is provided an inter predication method including: generating a merging candidate list of a block to be predicted and corresponding to a current prediction unit (PU); deriving motion information of the block to be predicted, on the basis of one of a plurality of merging candidates constituting the merging candidate list; and performing a prediction on the block to be predicted, on the basis of the derived motion information, to generate a prediction block corresponding to the current PU, wherein the current PU is a PU belonging to a merging candidate sharing unit, and wherein in the generating of the merging candidate list, one of a first merging candidate list consisting of a plurality of first merging candidates and a second merging candidate list consisting of a plurality of second merging candidates is selectively generated, the plurality of first merging candidates are motion information of a plurality of first blocks determined based on a location and size of the block to be predicted, and the plurality of second merging candidates are motion information of a plurality of second blocks determined based on a location and size of a block corresponding to the merging candidate sharing unit.

In the aforementioned aspect of the present invention, in the generating of the merging candidate list, whether the first merging candidate list is generated or whether the second merging candidate list is generated may be determined by the merging candidate sharing unit, and if it is determined that the second merging candidate list is generated, all PUs in the merging candidate sharing unit may share the second merging candidate list.

In addition, the merging candidate sharing unit may be a current coding unit (CU) to which the current PU belongs, and the plurality of second merging candidates may be motion information of a plurality of second blocks determined based on a location and size of a block to be decoded and corresponding to the current CU.

In addition, the plurality of first blocks may include a block closest in location to a left lower corner outside the block to be predicted, a block located in a lowermost portion among blocks adjacent to a left side of the block to be predicted, a block closest in location to a left upper corner outside the block to be predicted, a block located in a rightmost side among blocks adjacent to an upper portion of the block to be predicted, and a block closest in location to a right upper corner of the block to be predicted, and the plurality of second blocks may include a block closest in location to a left lower corner outside the block to be decoded, a block located in a lowermost portion among blocks adjacent to a left side of the block to be decoded, a block closest in location to a left upper corner outside the block to be decoded, a block located in a rightmost side among blocks adjacent to an upper portion of the block to be decoded, and a block closest in location to a right upper corner of the block to be decoded.

In addition, in the generating of the merging candidate list, if it is determined that the first merging candidate list is generated, motion information of a block located in the block to be decoded among the plurality of first blocks may be not used as the first merging candidate.

In addition, in the generating of the merging candidate list, if it is determined that the first merging candidate list is generated, a partitioning mode of the current PU is 2N×N, 2N×nU, or 2N×nD, and the current PU is a PU located in a lower portion in the current PU, then motion information of a block located in a rightmost side among blocks adjacent to an upper portion of the block to be predicted may be not used as the first merging candidate.

In addition, in the generating of the merging candidate list, if it is determined that the first merging candidate list is generated, a partitioning mode of the current PU is N×2N, nL×2N, or nR×2N, and the current PU is a PU located in a right side in the current PU, then motion information of a block located in a lowermost portion among blocks adjacent to a left side of the block to be predicted may be not used as the first merging candidate.

In addition, the generating of the merging candidate list and the driving of the motion information may be performed in parallel for all PUs in a parallel processing unit to which the current PU belongs, the parallel processing unit may be determined on the basis of a parallel processing level which indicates a size of the parallel processing unit, and information on the parallel processing level may be included in a picture parameter set (PPS) and is transmitted from an encoder to a decoder.

In addition, in the generating of the merging candidate list, whether the first merging candidate list is generated or the second merging candidate list is generated may be determined on the basis of a size of the block to be decoded and the parallel processing level.

In addition, in the generating of the merging candidate list, if the size of the block to be decoded is 8×8 and the size of the parallel processing unit is 4×4, the second merging candidate list may be generated.

According to another aspect of the present invention, there is provided a video decoding method including: generating a merging candidate list of a block to be predicted and corresponding to a current PU; deriving motion information of the block to be predicted, on the basis of one of a plurality of merging candidates constituting the merging candidate list; performing a prediction on the block to be predicted, on the basis of the derived motion information, to generate a prediction block corresponding to the current PU; and generating a reconstructed block on the basis of the generated PU, wherein the current PU is a PU belonging to a merging candidate sharing unit, and wherein in the generating of the merging candidate list, one of a first merging candidate list consisting of a plurality of first merging candidates and a second merging candidate list consisting of a plurality of second merging candidates is selectively generated, the plurality of first merging candidates are motion information of a plurality of first blocks determined based on a location and size of the block to be predicted, and the plurality of second merging candidates are motion information of a plurality of second blocks determined based on a location and size of a block corresponding to the merging candidate sharing unit.

In the aforementioned aspect of the present invention, in the generating of the merging candidate list, whether the first merging candidate list is generated or whether the second merging candidate list is generated may be determined by the merging candidate sharing unit, and if it is determined that the second merging candidate list is generated, all PUs in the merging candidate sharing unit may share the second merging candidate list.

In addition, the merging candidate sharing unit may be a current CU to which the current PU belongs, and the plurality of second merging candidates may be motion information of a plurality of second blocks determined based on a location and size of a block to be decoded and corresponding to the current CU.

In addition, the plurality of first blocks may include a block closest in location to a left lower corner outside the block to be predicted, a block located in a lowermost portion among blocks adjacent to a left side of the block to be predicted, a block closest in location to a left upper corner outside the block to be predicted, a block located in a rightmost side among blocks adjacent to an upper portion of the block to be predicted, and a block closest in location to a right upper corner of the block to be predicted, and the plurality of second blocks may include a block closest in location to a left lower corner outside the block to be decoded, a block located in a lowermost portion among blocks adjacent to a left side of the block to be decoded, a block closest in location to a left upper corner outside the block to be decoded, a block located in a rightmost side among blocks adjacent to an upper portion of the block to be decoded, and a block closest in location to a right upper corner of the block to be decoded.

In addition, in the generating of the merging candidate list, if it is determined that the first merging candidate list is generated, motion information of a block located in the block to be decoded among the plurality of first blocks may be not used as the first merging candidate.

In addition, in the generating of the merging candidate list, if it is determined that the first merging candidate list is generated, a partitioning mode of the current PU is 2N×N, 2N×nU, or 2N×nD, and the current PU is a PU located in a lower portion in the current PU, then motion information of a block located in a rightmost side among blocks adjacent to an upper portion of the block to be predicted may be not used as the first merging candidate.

In addition, in the generating of the merging candidate list, if it is determined that the first merging candidate list is generated, a partitioning mode of the current PU is N×2N, nL×2N, or nR×2N, and the current PU is a PU located in a right side in the current PU, then motion information of a block located in a lowermost portion among blocks adjacent to a left side of the block to be predicted may be not used as the first merging candidate.

In addition, the generating of the merging candidate list and the driving of the motion information may be performed in parallel for all PUs in a parallel processing unit to which the current PU belongs, the parallel processing unit may be determined on the basis of a parallel processing level which indicates a size of the parallel processing unit, and information on the parallel processing level may be included in a picture parameter set (PPS) and is transmitted from an encoder to a decoder.

In addition, in the generating of the merging candidate list, whether the first merging candidate list is generated or the second merging candidate list is generated may be determined on the basis of a size of the block to be decoded and the parallel processing level.

In addition, in the generating of the merging candidate list, if the size of the block to be decoded is 8×8 and the size of the parallel processing unit is 4×4, the second merging candidate list may be generated.

Advantageous Effects

According to a video coding method of the present invention, a complexity can be decreased and an encoding/decoding efficiency can be improved.

According to a video decoding method of the present invention, a complexity can be decreased and an encoding/decoding efficiency can be improved.

According to an inter prediction method of the present invention, a complexity can be decreased and an encoding/decoding efficiency can be improved.

According to a merging candidate list generation method of the present invention, a complexity can be decreased and an encoding/decoding efficiency can be improved.

MODE FOR INVENTION

Figure 1:
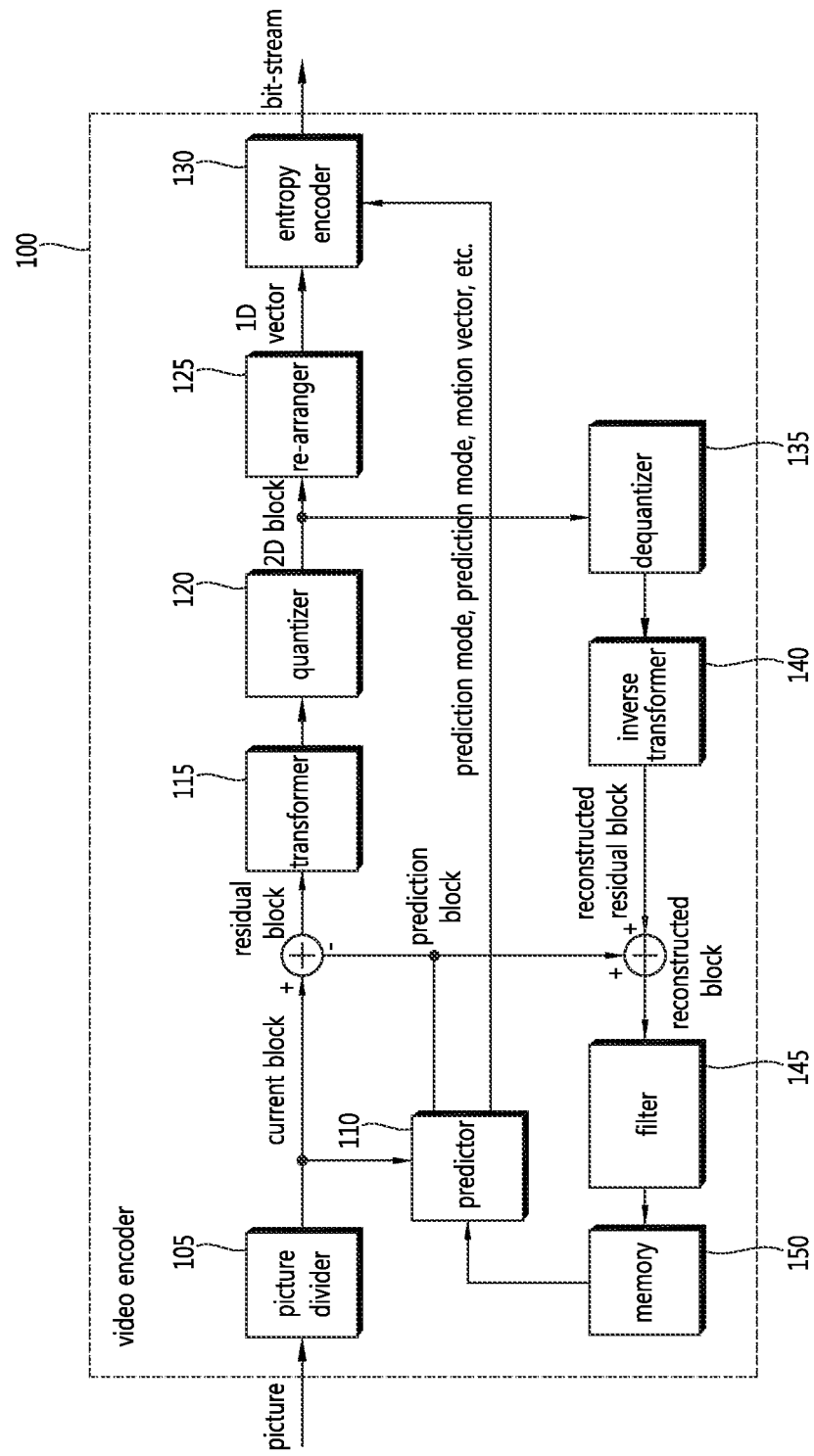
FIG. 1 is a block diagram of a video encoder according to an embodiment of the present invention.

Since the present invention may have various modifications and diverse embodiments, only specific embodiments are exemplarily illustrated in the drawings and will be described in detail. However, the present invention should not be construed as being limited to the specific embodiments set forth herein. The terminology used herein is for the purpose of describing particular embodiments only and is not intended to be limiting of the invention. As used herein, the singular forms are intended to include the plural forms as well, unless the context clearly indicates otherwise. In the present application, it is to be understood that the terms such as "including" or "having", etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Meanwhile, respective constructions in the drawings described in the present invention are illustrated independently for convenience of explanation regarding different particular functions in a video encoder/decoder, and it does not imply that the respective constructions are implemented with separate hardware entities or separate software entities. For example, among the respective constructions, two or more constructions may be combined into one construction, and one construction may be divided into a plurality of constructions. Embodiments in which the respective constructions are integrated and/or separated are also included in the scope of the present invention as long as not departing from the spirit of the invention.

In addition, some constitutional elements may be not essential constitutional elements for performing intrinsic functions but selective constitutional elements for improving only performance. The present invention may be implemented by including only the essential constitutional elements for implementing the spirit of the present invention except for the constitutional elements used to improve only performance. A structure in which only the essential constitutional elements are included except for the selective constitutional elements used for improving only performance is also included in the scope of the present invention.

Hereinafter, embodiments of the present invention will be described in detail with reference to the accompanying drawings. In addition, like reference numerals are used to indicate like elements throughout the drawings, and the same descriptions on the like elements will be omitted.

FIG. 1 is a block diagram of a video encoder according to an embodiment of the present invention. Referring to FIG. 1, a video encoder 100 includes a picture divider 105, a predictor 110, a transformer 115, a quantizer 120, a re-arranger 125, an entropy encoder 130, a dequantizer 135, an inverse transformer 140, a filter 145, and a memory 150.

The picture divider 105 may divide an input picture on the basis of at least one processing unit. In this case, the processing unit may be a prediction unit (PU), a transform unit (TU), or a coding unit (CU).

The predictor 110, as described below, may include an inter predictor which performs an inter prediction and an intra predictor which performs an intra prediction. The predictor 110 may generate a prediction block by performing a prediction for a processing unit of a picture in the picture divider 105. The processing unit of the picture in the predictor 100 may be a CU, a TU, or a PU. In addition, it is determined whether a prediction performed for a corresponding processing unit is an inter prediction or an intra prediction, and a specific content (e.g., a prediction mode, etc.) of each prediction method may be determined. In this case, the processing unit for performing a prediction may differ from the processing unit for determining the specific content. For example, a prediction method, a prediction mode, etc., may be determined in a unit of PU, and the prediction may be performed in a unit of TU. A residual value (i.e., residual block) between a generated prediction block and an original block may be input to the transformer 115. In addition, prediction mode information used for the prediction, motion vector information, etc., may be coded in the entropy encoder 130 together with the residual value and may be delivered to a decoder.

The transformer 115 transforms the residual block on the basis of a transform unit, and generates a transform coefficient. The transform unit of the transformer 115 may be a TU, and may have a quad tree structure. In this case, a size of the transform unit may be determined in a range of a specific maximum or minimum size. The transformer 115 may transform the residual block by using discrete cosine transform (DCT) and/or discrete sine transform (DST).

The quantizer 120 may generate a quantization coefficient by quantizing residual values transformed in the transformer 115. A value calculated by the quantizer 120 may be provided to the dequantizer 135 and the re-sorter 125.

The re-arranger 125 may re-arrange the quantization coefficient provided from the quantizer 120. The re-arranging of the quantization coefficient may increase coding efficiency in the entropy encoder 130. The re-arranger 125 may re-arrange quantization coefficients having a form of a 2-dimensional block into a 1-dimensional vector form by using a coefficient scanning method. The re-arranger 125 may change an order of coefficient scanning on the basis of a probabilistic statistics of coefficients transmitted from the quantizer, thereby increasing an entropy encoding efficiency in the entropy encoder 130.

The entropy encoder 130 may perform entropy encoding with respect to the quantization coefficients re-arranged by the re-arranger 125. The entropy encoder 130 may code a variety of information delivered from the re-arranger 125 and the predictor 110. The information may include coding unit's quantization coefficient information and block type information, prediction mode information, division unit information, prediction unit information and transmission unit information, motion vector information, reference picture information, block's interpolation information, filtering information, etc.

The entropy encoding may use Exponential Golomb, CAVLC(Context-Adaptive Variable Length Coding), and/or CABAC(Context-Adaptive Binary Arithmetic Coding). For example, a table for performing the entropy encoding, such as a variable length coding (VLC) table, may be stored in the entropy encoder 130. The entropy encoder 130 may perform the entropy encoding by using the stored VLC table. For another example, in the CABAC entropy encoding method, the entropy encoder 130 may convert a symbol into a binary form, i.e., a bin, and thus may generate a bit-stream by performing arithmetic encoding on the bin according to a bit generation probability.

When the entropy encoding is applied, an index having a high value and its corresponding short codeword may be assigned to a symbol having a high generation probability, and an index having a high value and its corresponding long codeword may be assigned to a symbol having a low generation probability. Accordingly, a bit amount for symbols to be coded may be decreased, and a video compression performance may be improved by the entropy encoding.

The dequantizer 135 may dequantize values quantized by the quantizer 120. The inverse transformer 140 may inverse-transform values dequantized by the dequantizer 135. Residual values generated in the dequantizer 135 and the inverse transformer 140 may be combined with a prediction block predicted by the predictor 110, and thus a reconstructed block may be generated.

The filter 145 may apply an in-loop filter to the reconstructed block and/or picture. The in-loop filter may include a deblocking filter, a sample adaptive offset (SAO), and/or an adaptive loop filter (ALF), etc.

The deblocking filter may remove block distortion which occurs at a boundary between blocks in the reconstructed picture. The SAO may add a proper offset value to a pixel value to compensate for a coding error. The ALF may perform filtering on the basis of a value used to compare an original image with an image reconstructed after filtering a block through the deblocking filter.

Meanwhile, regarding the reconstructed block used in the intra prediction, the filter 145 may not apply the filtering.

The memory 150 may store the reconstructed block or picture calculated by using the filter 145. The reconstructed block or picture stored in the memory 150 may be provided to the predictor 110 for performing the inter prediction.

Figure 2:
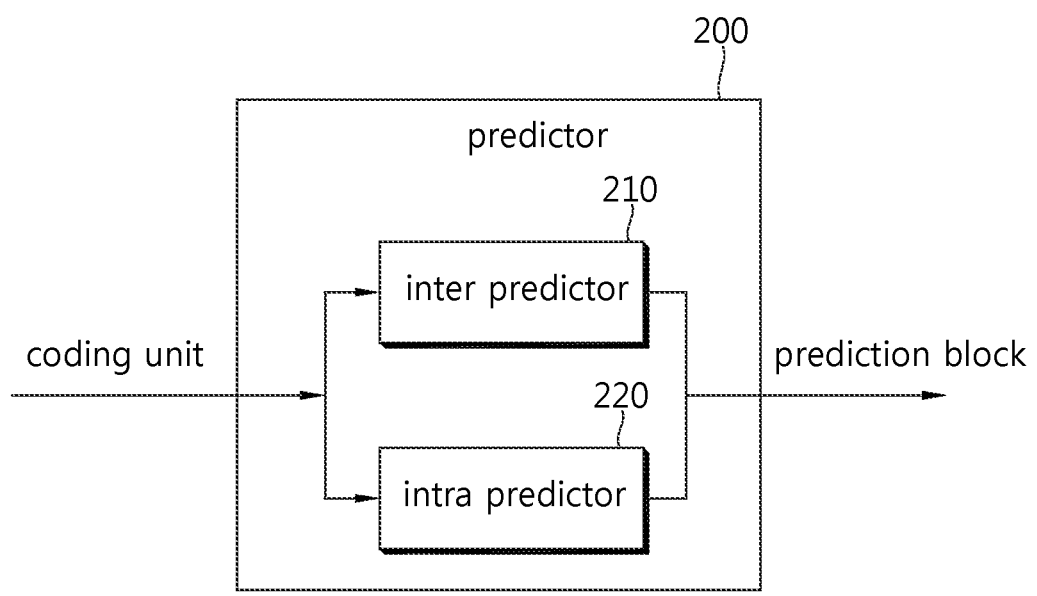
FIG. 2 is a schematic view showing the concept of a predictor according to an embodiment of the present invention.

FIG. 2 is a schematic view showing the concept of a predictor according to an embodiment of the present invention. Referring to FIG. 2, a predictor 200 may include an inter predictor 210 and an intra predictor 220.

The inter predictor 210 may generate a prediction block by performing a prediction on the basis of information of either a previous picture or a next picture of a current picture. In addition, the intra predictor 220 may generate the prediction block by performing the prediction on the basis of pixel information in the current picture.

Regarding a prediction unit (PU), the inter predictor 210 may select a reference picture, and may select a reference block having the same size as the PU as a pixel sample unit. Subsequently, the inter predictor 210 may generate a prediction block which is a sample unit (e.g., a ½ pixel sample unit and a ¼ pixel sample unit) smaller than an integer unit and thus is the most similar to a current PU and of which a residual signal can be minimized and a motion vector to be coded can also be minimized. In this case, the motion vector may be expressed in a unit smaller than an integer pixel.

An index of the reference picture selected by the inter predictor 210 and information on the motion vector may be coded and delivered to the decoder.

Figure 3:
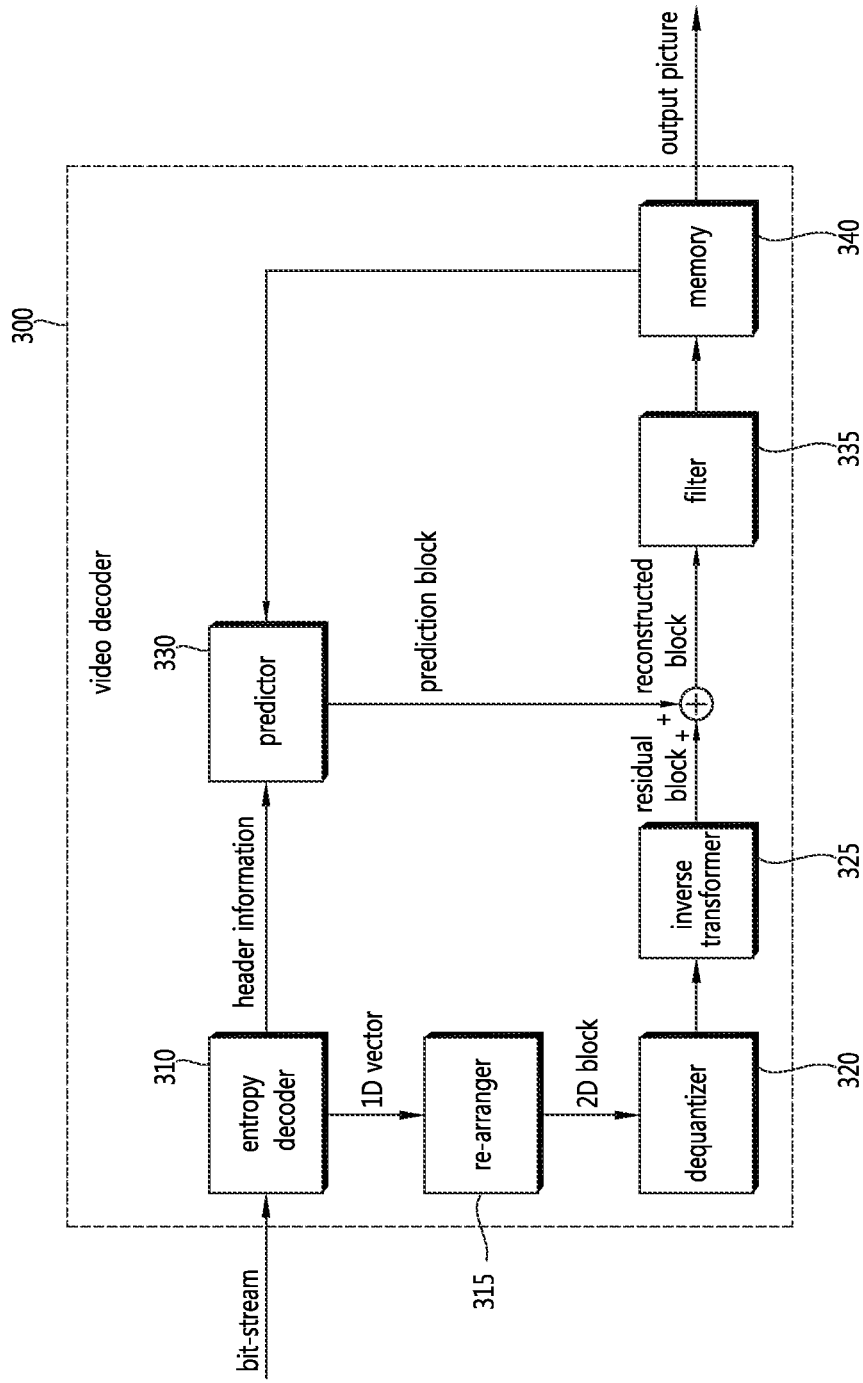
FIG. 3 is a block diagram of a video decoder according to an embodiment of the present invention.

FIG. 3 is a block diagram of a video decoder according to an embodiment of the present invention. Referring to FIG. 3, a video decoder 300 may include an entropy decoder 310, a re-arranger 315, a dequantizer 320, an inverse transformer 325, a predictor 330, a filter 335, and a memory 340.

When a video bit-stream is input to the video decoder, the input bit-stream may be decoded according to an operation of processing video information in a video encoder.

The entropy decoder 310 may perform entropy decoding on the input bit-stream. An entropy decoding method is similar to the aforementioned entropy encoding method. When the entropy decoding is applied, an index having a high value and its corresponding short codeword may be assigned to a symbol having a high generation probability, and an index having a high value and its corresponding long codeword may be assigned to a symbol having a low generation probability. Accordingly, a bit amount for symbols to be coded may be decreased, and a video compression performance may be improved by the entropy encoding.

Among a plurality of pieces of information decoded by the entropy decoder 310, information for generating a prediction block may be provided to the predictor 330, and a residual value subjected to entropy decoding in the entropy decoder may be input to the re-arranger 315.

The re-arranger 315 may re-arrange the bit-stream subjected to the entropy decoding in the entropy decoder 310 according to a re-arrangement method used in a video encoder. The re-arranger 315 may perform the re-arrangement by reconstructing coefficients expressed in a 1-dimensional vector format into coefficients of a 2-dimensional block form. The re-arranger 315 may receive information related to coefficient scanning performed in the encoder and may perform re-arranging by using an inverse scanning method on the basis of an order of scanning performed in the encoder.

The dequantizer 320 may perform dequantization on the basis of a quantization parameter provided from the encoder and a coefficient value of a re-arranged block.

According to a result of quantization performed by the video encoder, the inverse transformer 325 may perform inverse DCT and/or inverse DST with respect to DCT and DST performed by the transformer of the encoder. The inverse transformation may be performed based on a determined transmission unit or an image division unit. The transformer of the encoder may selectively perform the DCT and/or the DST according to a plurality of pieces of information such as a prediction method, a current block size, and/or a prediction direction, etc. The inverse transformer 325 of a decoder may perform inverse transformation on the basis of information on transformation performed in the transformer of the encoder.

The predictor 330 may generate a prediction block on the basis of prediction block generation-related information provided from the entropy decoder 310 and previously decoded block and/or picture information provided from the memory 340. A reconstructed block may be generated by using a prediction block generated from the predictor 330 and a residual block provided from the inverse transformer 325.

The reconstructed block and/or picture may be provided to the filter 335. The filter 335 may apply an in-loop filter to the reconstructed block and/or picture. The in-loop filter may include a deblocking filter, a sample adaptive offset (SAO), and/or an adaptive loop filter (ALF), etc.

The memory 340 may store the reconstructed picture or block so as to be used as a reference picture or a reference block, or may provide the reconstructed picture to an output element.

Figure 4:
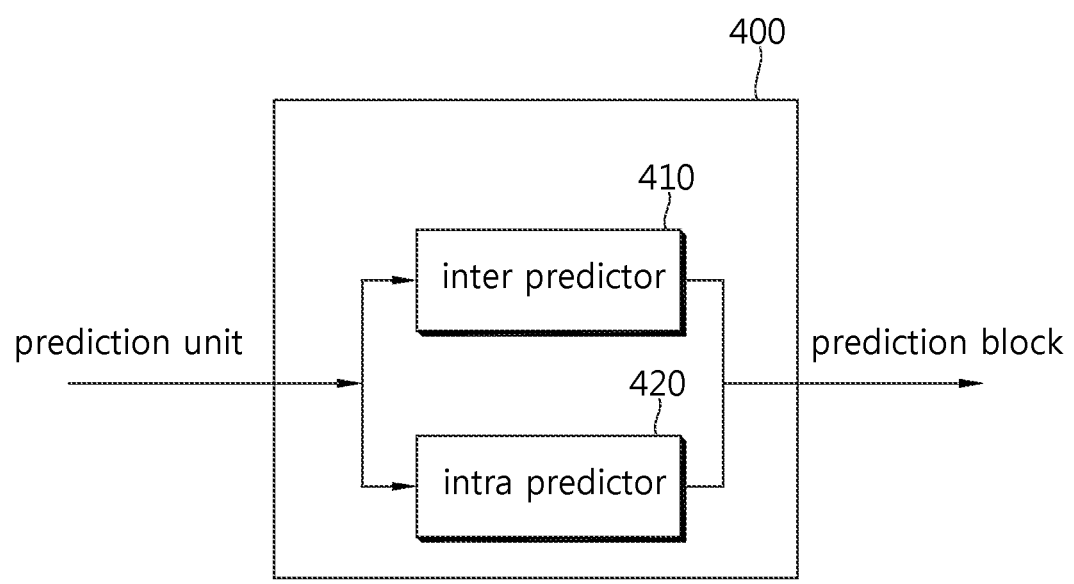
FIG. 4 is a schematic view showing the concept of a predictor of a video decoder according to an embodiment of the present invention.

FIG. 4 is a schematic view showing the concept of a predictor of a video decoder according to an embodiment of the present invention.

Referring to FIG. 4, a predictor 400 may include an intra predictor 420 and an inter predictor 410.

The intra predictor 420 may generate a prediction block on the basis of pixel information in a current picture, when a prediction mode for a corresponding PU is an intra prediction mode (i.e., a prediction mode in a screen).

If a prediction mode for the PU is an inter prediction mode (i.e., an inter-screen prediction mode), the inter predictor 410 may use information required for the inter prediction of the current PU provided from the video encoder, for example, information regarding a motion vector, a reference picture index, etc., to perform an inter prediction on the current PU on the basis of information included in at least one of previous and next pictures of the current picture in which the current PU is included.

In this case, if a skip flag, merge flag, or the like of a coding unit (CU) received from the encoder is confirmed, the motion information may be derived in accordance therewith.

Hereinafter, if an "image" or a "screen" can be used for the same meaning as a "picture" according to a configuration or expression of the present invention, the "picture" can also be referred to as the "image" or the "screen". In addition, an inter prediction and an inter-screen prediction have the same meaning, and an intra prediction and an intra-screen prediction have the same meaning.

Figure 5:
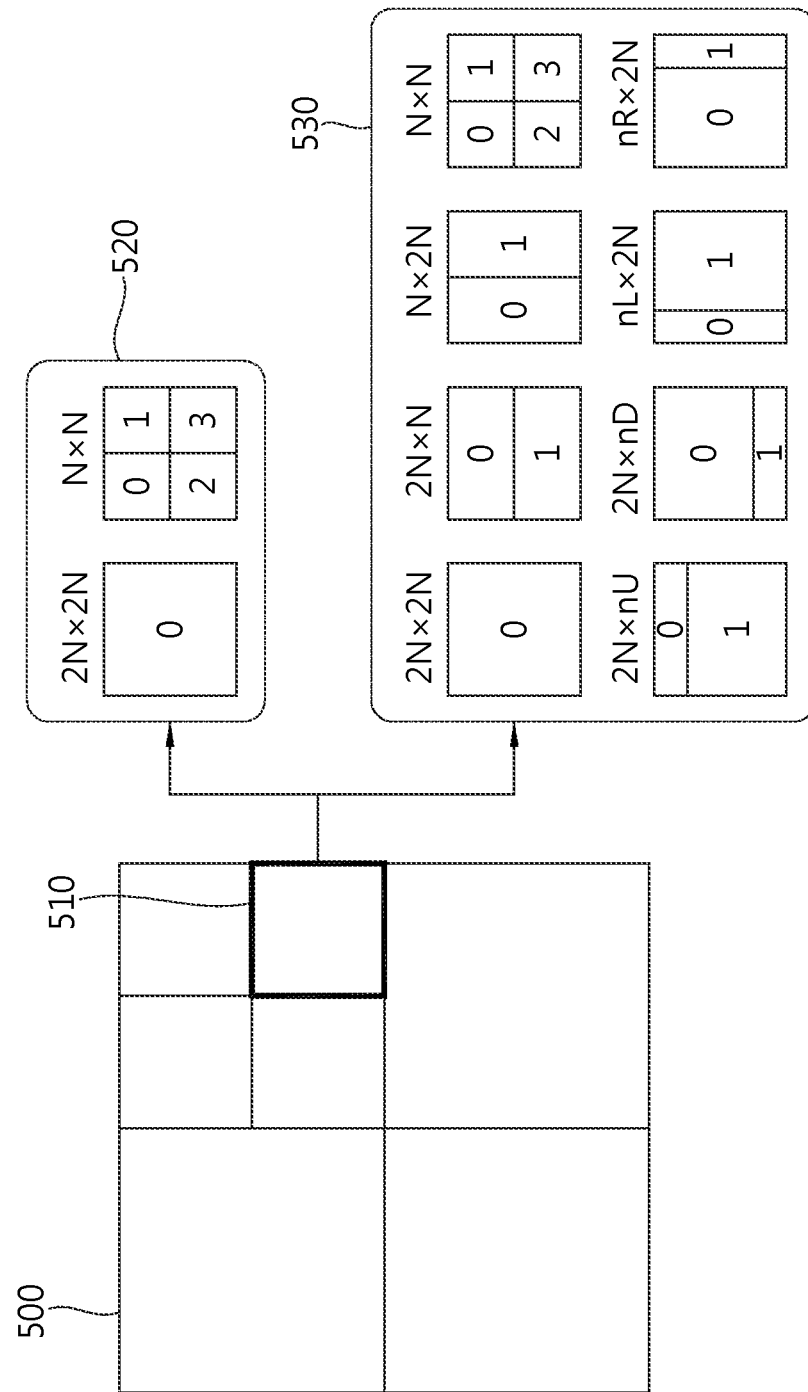
FIG. 5 is a schematic view showing the concept of an example of a quad tree structure of a processing unit in a system according to the present invention.

FIG. 5 is a schematic view showing the concept of an example of a quad tree structure of a processing unit in a system according to the present invention.

A coding unit (CU) may imply a unit of performing encoding/decoding of a picture. One coding block in a picture to be coded may have a depth based on a quad tree structure and may be partitioned repetitively. In this case, a coding block which is no longer partitioned may correspond to the CU, and an encoder may perform a encoding process for the CU. A size of the CU may be various, such as 64×64, 32×32, 16×16, 8×8, etc.

Herein, the coding block which is partitioned repetitively based on the quad tree structure may be called a coding tree block (CTB). One CTB may not be further partitioned, and in this case, the CTB itself may correspond to one CU. Therefore, the CTB may correspond to a largest coding unit (LCU) which is a CU having a maximum size. Meanwhile, a CU having a minimum size in the CTB may be called a smallest coding unit (SCU).

Referring to FIG. 5, through the partitioning, a CTB 500 may have a hierarchical structure consisting of a smaller CU 510. The hierarchical structure of the CTB 500 may be specified based on size information, depth information, partition flag information, etc. The information regarding a size of the CTB, the partition depth information, the partition flag information, etc., may be transmitted from an encoder to a decoder by being included in a sequence parameter set (SPS) on a bit-stream.

Meanwhile, which prediction will be performed between the inter prediction and the intra prediction may be determined in a unit of CU. If the inter prediction is performed, an inter prediction mode, motion information, etc., may be determined in a unit of PU, and if the intra prediction is performed, an intra prediction mode may be determined in a unit of PU. In this case, as described above, a processing unit by which the prediction is performed may be the same as a processing unit by which a prediction method and its specific content are determined, or the two units may be different. For example, the prediction method, the prediction mode, etc., may be determined in a unit of PU, and the prediction may be performed in a unit of transform unit (TU).

Referring to FIG. 5, one CU 510 may be used as one PU or may be partitioned into a plurality of PUs. In case of an intra prediction 520, a partitioning mode of a CU (and/or PU) may be a 2N×2N or N×N mode (where N is an integer). Herein, the PU in the 2N×2N mode may have a size of 2N×2N, and the PU in the N×N mode may have a size of N×N. In case of an inter prediction 530, a partitioning mode of a CU (and/or PU) may be a 2N×2N, 2N×N, N×2N, N×N, 2N×nU, 2N×nD, nL×2N or nR×2N mode (where N is an integer). Herein, the PU in the 2N×N mode may have a size of 2N×N, and the PU in the N×2N mode may have a size of N×2N. In addition, in the 2N×nU mode, one CU may be partitioned into a PU having a size of 2N×(½)N and a PU having a size of 2N×(3/2)N. In this case, the PU having the size of 2N×(½)N may be located in an upper portion of the PU having the size of 2N×(3/2)N. In the 2N×nD mode, one CU may be partitioned into a PU having a size of 2N×(3/2)N and a PU having a size of 2N×(½)N. In this case, the PU having the size of 2N×(½)N may be located in a lower portion of the PU having the size of 2N×(3/2)N. In addition, in the nL×2N mode, one CU may be partitioned into a PU having a size of (½)N×2N and a PU having a size of (3/2)N×2N. In this case, the PU having the size of (½)N×2N may be located in a left side of the PU having the size of (3/2)N×2N. In the nR×2N mode, one CU may be partitioned into a PU having a size of (3/2)N×2N and a PU having a size of (½)N×2N. In this case, the PU having the size of (½)N×2N may be located in a right side of the PU having the size of (3/2)N×2N.

The aforementioned partitioning mode is only for one embodiment, and thus the method of partitioning the CU into the PU is not limited to the aforementioned embodiment. For example, in case of the inter prediction 530, the partitioning mode of the CU (and/or PU) may use only four types of mode, i.e., 2N×2N, 2N×N, N×2N, and N×N, and another partitioning mode may be further used in addition to the aforementioned 8 types of partitioning mode.

A partitioning mode applied to a current CU (and/or PU) may be determined by an encoder. Information regarding the partitioning mode determined by the encoder may be coded and transmitted to a decoder. The decoder may determine the current CU (and/or PU) on the basis of the transmitted partitioning mode information. For example, the partitioning mode information may be transmitted to the decoder by using a part mode syntax.

Meanwhile, a number assigned to each PU shown in 520 and 530 of FIG. 5 denotes a partition index of the PU. Herein, the partition index may imply an index indicating to which PU the current PU corresponds among PUs to which the current CU belongs. For example, the partition index may be denoted by partIdx.

Referring to FIG. 5, for example, in the N×N partitioning mode shown in 520 of FIG. 5, a partition index of a PU located in a right upper portion in a CU may correspond to 1. Therefore, if 1 is assigned to the partition index of the current PU, the value of the partition index may indicate that the current PU is a PU located in the right upper portion in the current CU. For another example, in a 2N×nU partitioning mode shown in 530 of FIG. 5, a partition index of a PU located in a left side in a CU may correspond to 0. Therefore, if 0 is assigned to the partition index of the current PU, the value of the partition index may indicate that the current PU is a PU located in the left side in the current CU.

The method of assigning the partition index in each partitioning mode shown in FIG. 5 is only for one embodiment, and thus the method of determining whether to assign the partition index and of assigning the partition index may differ from the aforementioned embodiment. For example, in the 2N×nU partitioning mode shown in 530 of FIG. 5, the partition index of the PU located in the left side in the CU may correspond to 1. For another example, in a 2N×2N partitioning mode, since a CU is not partitioned into a plurality of PUs, a partition index may not be assigned to a PU. Hereinafter, for convenience of explanation, it is assumed in the embodiment of the present invention described below that the partitioning mode and partition index shown in FIG. 5 are applied when encoding and decoding are performed.

Hereinafter, in the present invention, a current block is a block for which a encoding, decoding, and/or prediction process is performed at present, and may imply a block corresponding to a processing unit when the encoding, decoding, and/or prediction process is performed. For example, if the prediction process is performed on the current block, the current block may correspond to a to-be-predicted block corresponding to a current PU. In addition, in the present invention, a block generated by the prediction is called a prediction block.

A 'unit' implies a processing unit when the encoding, decoding, etc., is performed, and thus may be distinguished from a 'block' indicating a group of pixels and/or samples. However, for convenience of explanation, the 'unit' may optionally refer to the 'block' corresponding to the 'unit' in the present invention. For example, hereinafter, in the present invention, a to-be-predicted block corresponding to one PU may be referred to as a PU, and a block to be coded/decoded and corresponding to one CU may be referred to as a CU. Such a distinction will be clearly understood by those ordinarily skilled in the art.

Meanwhile, if an inter prediction is performed on a current block, a prediction mode such as an advanced motion vector prediction (AMVP), a merge mode, and/or a skip mode may be used to decrease a transmission information amount based on the prediction.

A current block in the merge mode may be merged to another block (e.g., a neighboring block, herein the neighboring block includes a block adjacent to the current block and/or a block closest in location to an outer corner of the current block) in a current picture and/or a reference picture. In this case, it is said that the block is merged when motion information is acquired from motion information of another block in a current picture and/or a reference picture in the inter prediction of the current block.

Examples of merge-related information of the current block may include information indicating whether a prediction mode for the current block is a merge mode, information indicating to which merging candidate the current block is merged among merging candidates included in a merging candidate list, etc. Hereinafter, the information indicating whether the prediction mode for the current block is the merge mode is called a merge flag, and the information indicating to which merging candidate the current block is merged among the merging candidates included in the merging candidate list is called a merge index. For example, the merge flag may be indicated by merge_flag, and the merge index may be indicated by merge_idx. In this case, the merge index may be acquired only when the merge flag indicates that the prediction mode for the current block is the merge mode (e.g., merge_flag=1).

The skip mode is a prediction mode in which transmission of a residual signal which is a difference between the prediction block and the current block is skipped. In the skip mode, a value of the residual signal of the prediction block and the current block may be 0. Therefore, in the skip mode, the encoder may not transmit the residual signal to the decoder, and the decoder may generate a prediction block by using only motion information between the residual signal and the motion information. In the skip mode, the encoder may transmit the motion information to the decoder. In this case, the motion information may designate any one block among neighboring blocks of the current block so that motion information of the block is used for the current block.

In the aforementioned skip mode, to acquire the motion information of the current block, the same method used in the merge mode may be used. In this case, in the skip mode and the merge mode, the same neighboring blocks may be used as a candidate block for deriving the motion information. For example, in the skip mode, motion information of a merging candidate block indicated by a merge index among merging candidates included in a merging candidate list may be used directly as the motion information of the current block. In this case, the skip mode may also be called a merge skip mode. Hereinafter, the skip mode implies the aforementioned merge skip mode in the present invention. A specific embodiment of an inter prediction method in the merge mode will be described below with reference to FIG. 6.

Figure 6:
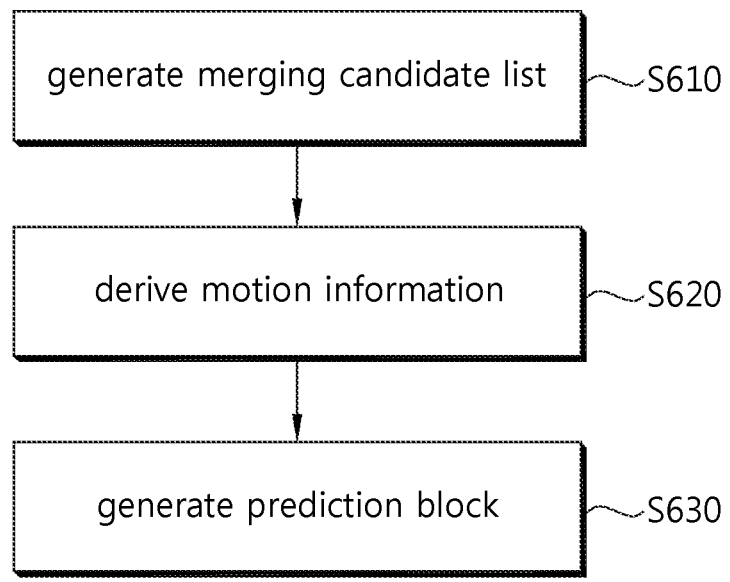
FIG. 6 is a flowchart briefly showing an embodiment of an inter prediction method in a merge mode.

FIG. 6 is a flowchart briefly showing an embodiment of an inter prediction method in a merge mode. The embodiment of FIG. 6 may apply to an encoder and a decoder. Hereinafter, the embodiment of FIG. 6 focuses on the decoder for convenience of explanation.

Referring to FIG. 6, the decoder may generate a merging candidate list consisting of a plurality of merging candidates (step S610). The decoder may derive the plurality of merging candidates by using a specific process, and may generate the merging candidate list on the basis of the derived merging candidate. In this case, motion information included in a block in a current picture and/or a col block in a reference picture other than the current picture may be used as the merging candidate and/or may be used to derive the merging candidate. Hereinafter, for convenience of explanation, the motion information used as the merging candidate is called a 'merging candidate block' in the present invention. An embodiment of merging candidates used to generate the merging candidate list will be described below.

Referring back to FIG. 6, the decoder may derive the motion information of the current block on the basis of the generated merging candidate list (step S620).

More specifically, the decoder may select a merging candidate used to derive the motion information of the current block among merging candidates constituting the merging candidate list. In one embodiment, the decoder may select a merging candidate indicated by a merge index transmitted from the encoder as the merging candidate used to derive the motion information of the current block. In this case, the decoder may derive the motion information of the current block on the basis of the selected merging candidate. For example, the decoder may use the motion information of the selected merging candidate directly as the motion information of the current block.

When the motion information of the current block is derived, the encoder may generate a prediction block for the current block on the basis of the derived motion information (step S630).

Figure 7:
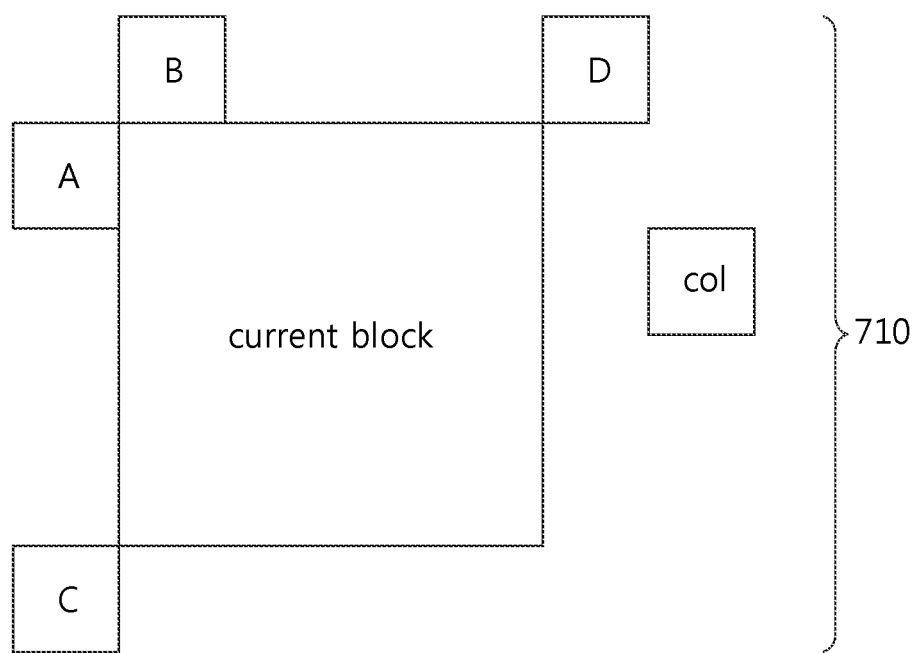
FIG. 7 is a schematic view showing an embodiment of merging candidates used to generate a merging candidate list.
Figure 7:
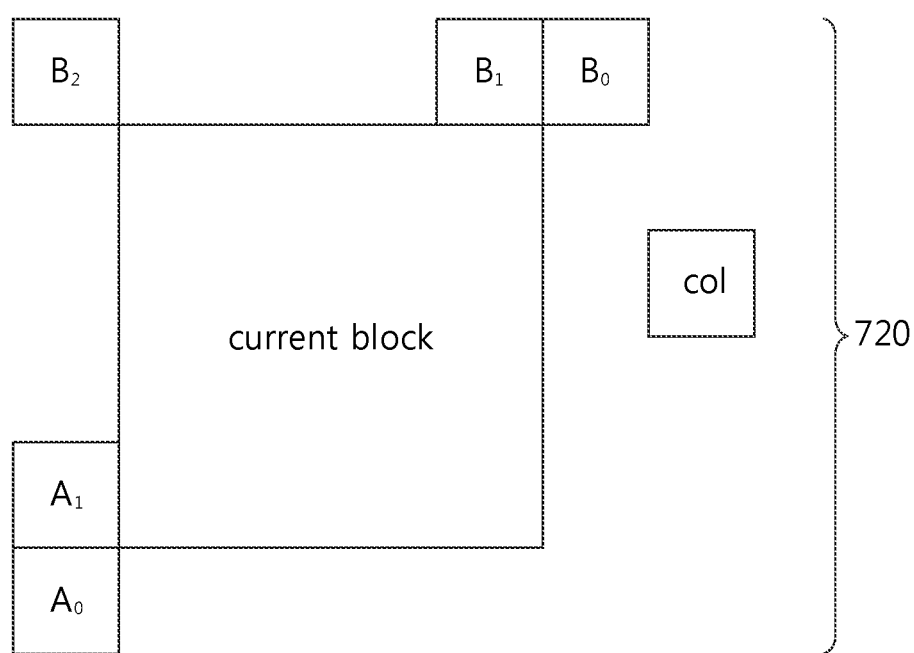

FIG. 7 is a schematic view showing an embodiment of merging candidates used to generate a merging candidate list.

When a merge mode is applied as described above, motion information of a current block may be derived on the basis of any one piece of motion information among merging candidates included in the merging candidate list. For example, among the merging candidates included in the merging candidate list, any one piece of motion information may be used as the motion information of the current block. In this case, a residual signal may be transmitted together with the motion information, and if a pixel value of a prediction block is used directly as a pixel value of the current block, the residual signal may not be transmitted.

An embodiment of merging candidates used to generate a merging candidate list is shown in 710 of FIG. 7. Referring to 710 of FIG. 7, a left neighboring block A of the current block and/or an upper neighboring block B of the current block may be used as the merging candidate block. In this case, as illustrated, the left neighboring block of the current block may be a block located in an uppermost portion among blocks adjacent to a left side of the current block, and the upper neighboring block of the current block may be a block located in a leftmost side among blocks adjacent to an upper portion of the current block. In addition, a left lower corner block C and/or a right upper corner block D may be used as the merging candidate block. The aforementioned left neighboring block A, upper neighboring block B, left lower corner block C, and right upper corner block D may correspond to neighboring blocks of the current block located in a current picture. Therefore, merging candidates derived from the merging candidate blocks may be called spatial merging candidates. In addition, in another perspective, since the spatial merging candidate may be used to predict a motion vector of the current block, it may also be called a spatial motion vector predictor (SMVP).

In addition, a col block COL may be used in 710 of FIG. 7 as the merging candidate block. The col block may correspond to a block in a reference picture other than the current picture. More specifically, an encoder and a decoder may select a block at a specific location in the reference picture and/or a location determined by a specific process as the col block. Herein, a location of the col block may be derived on the basis of a block in a current block and/or a reference picture co-located with the current block (hereinafter, called a 'co-located block', for convenience of explanation). The aforementioned col block is a block derived from the reference picture. Therefore, a merging candidate derived from the col block may be called a temporal merging candidate. In addition, from another perspective, since the temporal merging candidate may be used to predict a motion vector of the current block, it may be called a temporal motion vector predictor (TMVP).

Another embodiment of merging candidates used to generate a merging candidate list is shown in 720 of FIG. 7. Referring to 720 of FIG. 7, the merging candidate list may include motion information of a left lower corner block $A_0$, a right upper corner block $B_0$, and/or a left upper corner block $B_2$ as the merging candidate. In addition, the merging candidate list may include motion information of a left neighboring block $A_1$ of the current block and/or an upper neighboring block $B_1$ of the current block as the merging candidate. In this case, the left neighboring block $A_1$ may be a block located in a lowermost portion among blocks adjacent to a left side of the current block, and the upper neighboring block $B_1$ may be a block located in a rightmost side among blocks adjacent to an upper portion of the current block. The aforementioned left lower corner block $A_0$, left neighboring block $A_1$, right upper corner block $B_0$, upper neighboring block $B_1$, and left upper corner block $B_2$ may correspond to neighboring blocks of the current block located in the current picture. Therefore, merging candidates derived from the merging candidate blocks may be called spatial merging candidates. In addition, in another perspective, since the spatial merging candidate may be used to predict a motion vector of the current block, it may also be called a spatial motion vector predictor (SMVP).

In addition, in 720 of FIG. 7, similarly to 710 of FIG. 7, motion information of a col block may be used as a merging candidate included in the merging candidate list. As described above, the col block may correspond to a block in a reference picture other than the current picture. Herein, a location of the col block may be derived on the basis of the current block and/or a co-located block. The aforementioned col block is a block derived from the reference picture. Therefore, a merging candidate derived from the col block may be called a temporal merging candidate. In addition, from another perspective, since the temporal merging candidate may be used to predict a motion vector of the current block, it may be called a temporal motion vector predictor (TMVP).

The merging candidates used to generate the merging candidate list in the present invention are not limited to the aforementioned embodiment, and thus the merging candidates may optionally be derived differently from the aforementioned embodiment. However, unless otherwise specified in the present invention, it is assumed hereinafter that co-located merging candidates as shown in 720 of FIG. 7 are used to predict the merge mode according to a to-be-predicted block (and/or a current block). In addition, hereinafter, when a content regarding a merging candidate of a PU to be merged/skipped is described in the present invention, a block closest in location to a left lower corner outside the PU is denoted by $A_0$, a block located in a lowermost portion among blocks adjacent to a left side of the PU is denoted by $A_1$, a block closest in location to a right upper corner outside the PU is denoted by $B_0$, a block located in a rightmost side among blocks adjacent to an upper portion of the PU is denoted by $B_1$, and a block closest in location to a left upper corner outside the PU is denoted by $B_2$.

Referring to the embodiment of FIG. 7, a method of selecting merging candidates constituting a merging candidate list may be extended variously. An encoder and a decoder may configure the merging candidate list by selecting merging candidates according to the aforementioned embodiment of FIG. 7. In this case, when the merging candidates are selected, the encoder and the decoder may configure the merging candidate list by excluding redundant candidates to decrease a redundancy.

In addition, in the aforementioned embodiment of FIG. 7, the number of merging candidates constituting the merging candidate list may be limited to a specific fixed number. For example, in the embodiment of 720 of FIG. 7, it is assumed that the number of merging candidates is 5, and the merging candidates are added and/or inserted to the merging candidate list in the order of $\{A_1, B_1, B_0, A_0, B_2, COL\}$. In this case, if the blocks $A_1, B_1, B_0, A_0, B_2$, and COL are all available, only motion information of the blocks $A_1, B_1, B_0, A_0$, and COL may be determined as the merging candidates included in the merging candidate list. For another example, among the blocks $A_1, B_1, B_0, A_0, B_2$, and COL, the number of available blocks may be less than 5. In this case, the encoder and the decoder may derive a new merging candidate by using a specific process on the basis of the available merging candidate, so that the number of finally derived merging candidates is 5.

Meanwhile, for example, when an inter prediction is performed in a merge mode and/or a skip mode, the encoder and the decoder may sequentially perform a motion estimation (ME) for each PU. However, for another example, to improve a encoding/decoding performance, the encoder and the decoder may perform the ME simultaneously for a plurality of PUs. That is, the ME in the merge mode and/or the skip mode may be performed in parallel for the plurality of PUs, and in this case, the ME may be called a parallel ME. Hereinafter, in the present invention, the merge mode to which the parallel ME is applied is called a parallel merge mode and/or a parallel merge, and a skip mode to which the parallel ME is applied is called a parallel skip mode and/or a parallel skip.

Embodiments described below focus on the parallel merge mode for convenience of explanation. However, the embodiments described below are not limited to the parallel merge mode, but the same or similar method may also be applied to the parallel skip mode.

Figure 8:
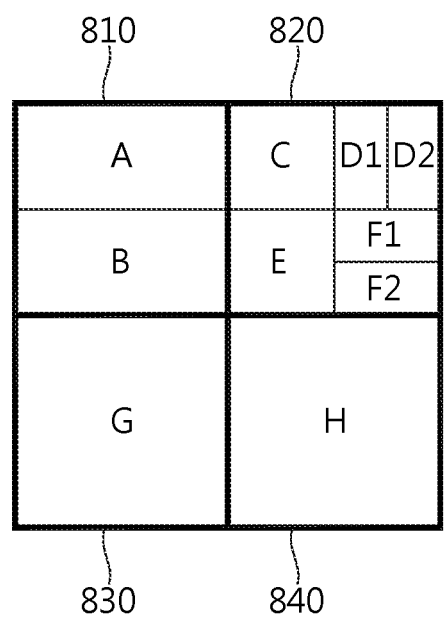
FIG. 8 is a schematic view showing an embodiment of a parallel processing unit in a merge mode and a skip mode.

FIG. 8 is a schematic view showing an embodiment of a parallel processing unit in a merge mode and a skip mode.

A whole block shown in FIG. 8 indicates one coding tree block (CTB), and the CTB may correspond to a largest coding unit (LCU). As described above, the CTB may have a hierarchical structure consisting of smaller coding units through partitioning, and each coding unit may be used as one PU or may be partitioned into a plurality of PUs. Therefore, each of square blocks and rectangular blocks constituting the CTB of FIG. 8 may correspond to one PU.

Meanwhile, each of square blocks indicated by 810, 820, 830, and 840 of FIG. 8 may indicate a parallel processing unit for performing a parallel ME. That is, the LCU may be partitioned into a plurality of non-redundant parallel processing units. Herein, for example, the plurality of parallel processing units may have the same size. In this case, the encoder and the decoder may perform the ME simultaneously for all PUs within one parallel processing unit. For example, the ME may be performed in parallel for a PU A and PU B included in the parallel processing unit 810. The parallel processing unit corresponds to an area to which the parallel ME is applied, and thus may also be called a motion estimation region (MER). Hereinafter, for convenience of explanation, the parallel processing unit for performing the parallel ME is called the MER in the present invention.

When the parallel ME is applied in the merge mode and/or the skip mode, the encoder needs to transmit information related to the parallel ME to the decoder. As described above, since the parallel ME may be applied to all PUs within the MER, information transmitted from the encoder to the decoder may correspond to a parallel processing level in the merge mode and/or the skip mode. Herein, the parallel processing level may correspond to a size of the parallel processing unit for performing the parallel ME, and thus may also correspond to a size of the MER. For example, if the parallel ME is performed in a unit of a block having a size of 32×32, that is, if the size of the MER corresponds to 32×32, it can be said that the parallel ME is performed in a 32×32 parallel processing level. The parallel processing level indicates a parallel processing level in the merge mode and/or the merge skip mode, and thus may also be called a parallel merge level.

Herein, the parallel processing level may be limited within a specific range. For example, the parallel processing level may be limited to be less than a size between 4×4 and the LCU size. In this case, the MER may have a size less than or equal to an LCU size and/or a CTB size.

Information related to the aforementioned parallel processing level may be transmitted from the encoder to the decoder by being included in a sequence parameter set (SPS) or picture parameter set (PPS) on a bit-stream. The information related to the parallel processing level included in the PPS may be defined by a syntax element included in Table 1 below for example.

TABLE 1

```
pic_parameter_set_rbsp( ) {
  pic_parameter_set_id
  seq_parameter_set_id
  entropy_coding_mode_flag
  num_temporal_layer_switching_point_flags
  for( i = 0; i < num_temporal_layer_switching_point_flags; i++)
    temporal_layer_switching_point_flag[ i ]
  num_ref_idx_l0_default_active_minus1
  num_ref_idx_l1_default_active_minus1
  pic_init_qp_minus26 /* relative to 26 */
  constrained_intra_pred_flag
  shared_pps_info_enabled_flag
  if( shared_pps_info_enabled_flag )
    if( adaptive_loop_filter_enabled_flag )
      alf_param( )
  if( cu_qp_delta_enabled_flag )
    max_cu_qp_delta_depth
      log2_parallel_merge_level_minus2
  rbsp_trailing_bits( )
}
```

Herein, log 2_parallel_merge_level_minus2 may denote a parallel processing level in the merge mode and/or the skip mode. More specifically, a value assigned to log 2_parallel_merge_level_minus2 may correspond to a value obtained by subtracting 2 from a log value of an actual parallel processing level, that is, a log value of an actual MER size. If a minimum size of a PU is 4×4, a minimum value of the log value of the parallel processing level may correspond to 2. Therefore, to decrease a transmission information amount, a value obtained by subtracting 2 from the log value of the actual parallel processing level may be assigned to log 2_parallel_merge_level_minus2.

The parallel processing level information defined in the PPS is not limited to the aforementioned embodiment. In the embodiment of Table 1, syntaxes indicating another information other than the information related to the parallel processing level may optionally be applied differently.

Meanwhile, in Table 1, log 2_parallel_merge_level_minus2 may have the same meaning as an embodiment of Table 2 below according to an assigned value.

TABLE 2

| log2_parallel_merge_level_minus2 | MER size | Remark |
| --- | --- | --- |
| 0 | 4 × 4 | Since a permitted minimum PU size is 4 × 4, merge/skip mode is applied sequentially for all PUs in LCU. |
| 1 | 8 × 8 | Parallel merge/skip mode is applied for all PUS in 8 × 8 block. |
| 2 | 16 × 16 | Parallel merge/skip mode is applied for all PUs in 16 × 16 block. |

TABLE 2-continued

| log2_parallel_merge_level_minus2 | MER size | Remark |
| --- | --- | --- |
| 3 | 32 × 32 | Parallel merge/skip mode is applied for all PUs in 32 × 32 block. |
| 4 | 64 × 64 | Parllel merge/skip mode is applied for all PUs in 64 × 64 block. |

Referring to Table 2, if a value 0 is assigned to log 2_parallel_merge_level_minus2, the MER size may correspond to 4×4. In this case, since a size of a smallest PU is 4×4, the encoder and the decoder may perform the ME sequentially for all PUs in the LCU. For another example, if a value 2 is assigned to log 2_parallel_merge_level_minus2, the MER size may correspond to 16×16. In this case, the encoder and the decoder may perform a parallel ME at a 16×16 parallel processing level. That is, the encoder and the decoder may perform the ME in parallel for all PUs in a 16×16 block. Likewise, even if another value is assigned to log 2_parallel_merge_level_minus2, the encoder and the decoder may perform the parallel ME by using a similar method according to the assigned value.

Meanwhile, one coding tree block may include a plurality of CUs. In this case, one parallel processing unit, that is, one MER, may include one PU or may have the same size as one CU. In addition, one MER may include a plurality of CUs.

For example, referring to FIG. 8, the MER 810 may have the same size as one CU consisting of a PU A and a PU B. In addition, the MER 830 and the MER 840 have the same size as a CU G and a CU H, respectively. As such, if one CU has the same size as the MER, it may be seen that a parallel ME for the CU is performed in a unit of CU. On the other hand, the MER 820 may include a CU C (herein, the CU C corresponds to a PU C), a CU D (herein, the CU D includes a PU D1 and a PU D2), a CU E (herein, the CU E corresponds to a PU E), and a CU F (herein, the CU F includes a PU F1 and a PU F2). In this case, the ME in the merge mode and/or the skip mode may be performed in parallel for all of the PUs C, D1, D2, E, F1, and F2 in the MER 820.

Meanwhile, as described above with reference to the embodiment of FIG. 8, to perform the parallel ME in the merge mode and/or the skip mode, an inter prediction and/or an ME must be allowed to be performed independently for a parallel processing unit, that is, for all PUs in the MER. However, in the aforementioned merge mode and/or the skip mode, a problem may occur in regards to the parallel ME.

Figure 9:
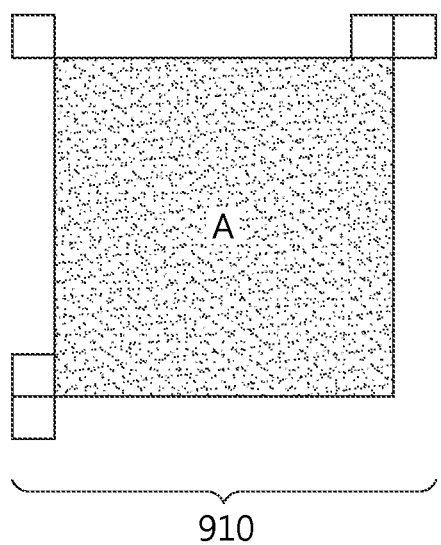
FIG. 9 is a schematic view for explaining a problem occurring when a parallel motion estimation (ME) is performed in a merge mode.
Figure 9:
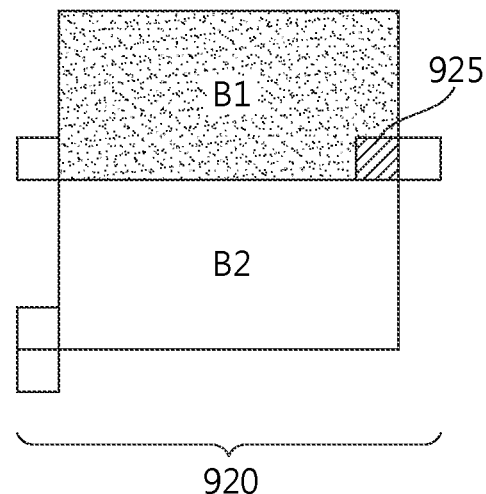
Figure 9:
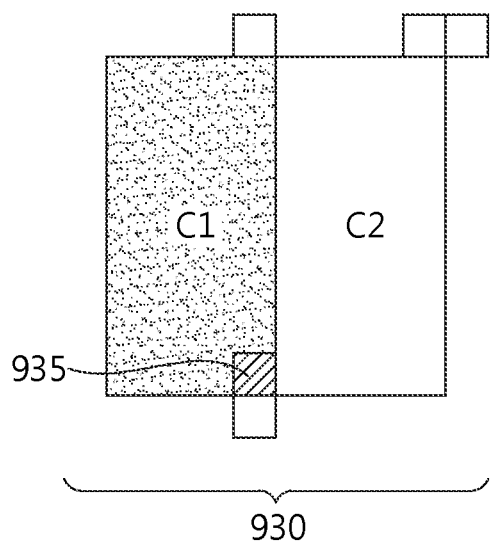
Figure 9:
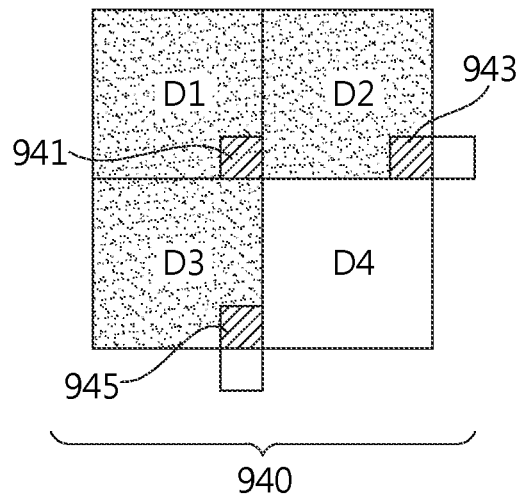

FIG. 9 is a schematic view for explaining a problem occurring when a parallel ME is performed in a merge mode. 910, 920, 930, and 940 of FIG. 9 each indicates one CU.

As described above in FIG. 8, a parallel processing unit, that is, an MER, may have the same size as a current CU, or may not have the same size. It is assumed in the embodiment of FIG. 9 that a size of the MER is the same as the current CU. In this case, each CU shown in FIG. 9 may correspond to a parallel processing unit, and in this case, a parallel ME may be performed in a unit of CU. However, problems described below with reference to FIG. 9 may also occur equally or similarly in a case where the MER size is greater than the current CU.

In 910 of FIG. 9, a partitioning mode of a CU (and/or PU) is 2N×2N. Therefore, one CU may be used as a PU A without being partitioned, and thus a problem caused by a parallel ME may not occur.

In 920 of FIG. 9, a partitioning mode of a CU (and/or PU) is 2N×N. In this case, for a parallel ME, an ME is performed simultaneously for an upper PU B1 and a lower PU B2. However, among merging candidates for the lower PU B2, motion information of a block 925 located in a rightmost side and adjacent to an upper portion of the lower PU B2 may be used as a merging candidate of the lower PU B2 when encoding/decoding of the upper PU B1 is complete. As such, since the lower PU B2 uses motion information belonging to the upper PU B1, the ME cannot be performed simultaneously for PUs belonging to the CU in 920 of FIG. 9.

In 930 of FIG. 9, a partitioning mode of a CU (and/or PU) is N×2N. In this case, for a parallel ME, an ME must be performed simultaneously for a left PU C1 and a right PU C2. However, among merging candidates for the right PU C2, motion information of a block 935 located in a lowermost portion and adjacent to a left side of the right PU C2 may be used as a merging candidate of the right PU C2 when encoding/decoding of the left PU C1 is complete. As such, since the right PU C2 uses motion information belonging to the left PU C1, the ME cannot be performed simultaneously for PUs belonging to the CU in 930 of FIG. 9.

In 940 of FIG. 9, a partitioning mode of a CU (and/or PU) is N×N. In this case, for a parallel ME, an ME must be performed simultaneously for a left upper PU D1, a right upper PU D2, a left lower PU D3, and a right lower PU D4. However, for example, among merging candidates for the right lower PU D4, motion information of a block 941 located in a left upper corner of the right lower PU D4, a block 943 located in a rightmost side and adjacent to an upper portion of the right lower PU D4, and a block 945 located in a lowermost portion and adjacent to a left side of the right lower PU D4 may be used as a merging candidate of the right lower PU D4 when encoding/decoding of the left upper PU D1, right upper PU D2, and left lower PU D3 is complete. In addition, in 940 of FIG. 9, a similar problem as the aforementioned right lower PU D4 may also occur in the right upper PU D2 and the left lower PU D3. As such, PUs other than the left upper PU D1 use motion information belonging to other PUs, and thus the ME cannot be performed simultaneously for PUs belonging to the CU in 940 of FIG. 9.

Although only a problem for a case where the partitioning mode of the CU (and/or PU) is 2N×2N, 2N×N, N×2N, and N×N is described in the aforementioned embodiment, such a problem may also occur equally or similarly in another partitioning mode (e.g., 2N×nU, 2N×nD, nL×2N, or nR×2N). Hereinafter, a method of deriving a merging candidate and a method of configuring a candidate list will be described to solve the problems described above with reference to FIG. 9 according to an embodiment of the present invention.

Figure 10:
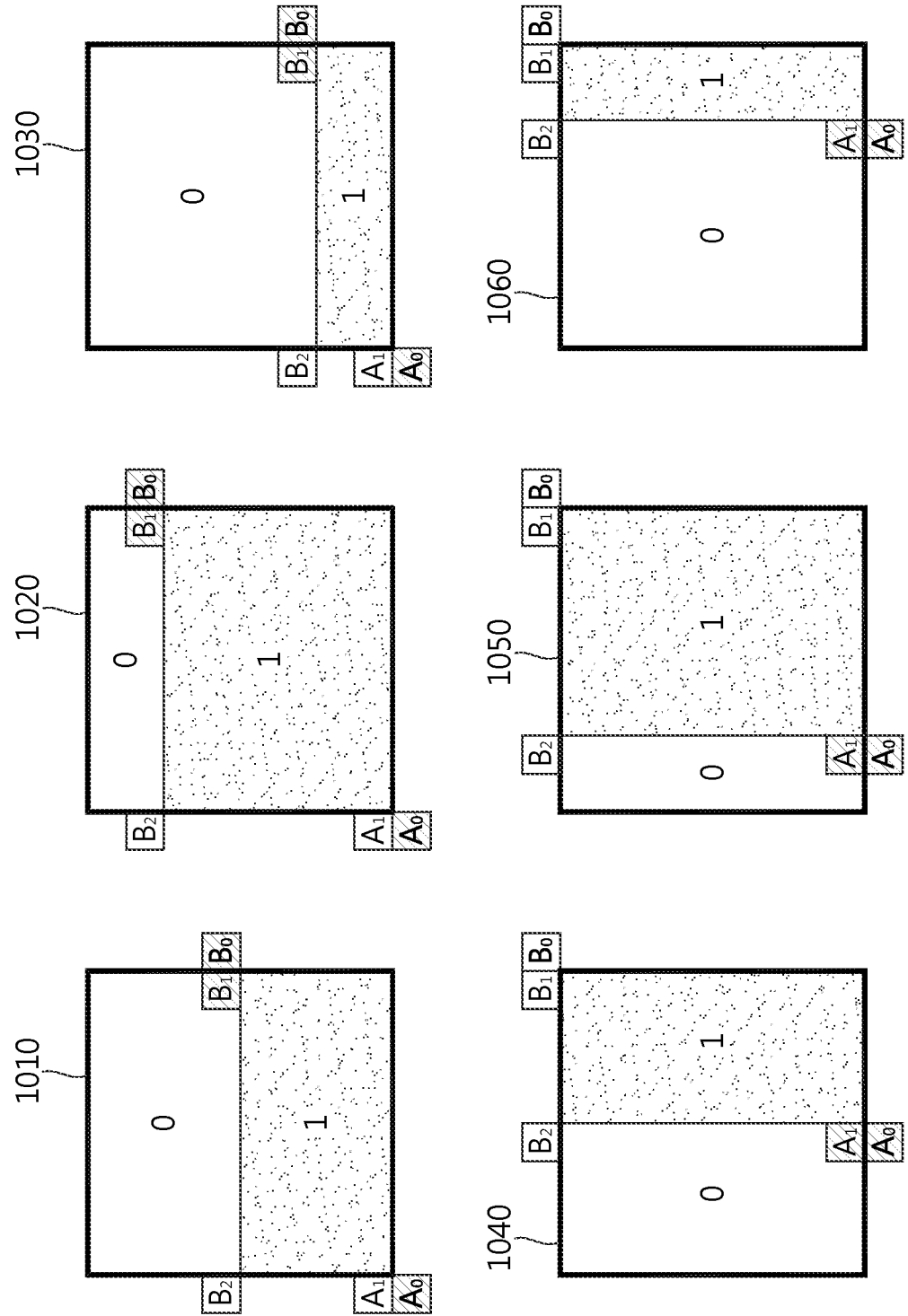
FIG. 10 is a schematic view showing an embodiment of a method of deriving a merging candidate for enabling a parallel ME.

FIG. 10 is a schematic view showing an embodiment of a method of deriving a merging candidate for enabling a parallel ME. 1010 to 1060 of FIG. 10 each indicates one CU, and a number marked in a PU belonging to each CU denotes a partition index.

For convenience of explanation, it is assumed in the embodiment of FIG. 10 that an MER has the same size as a current CU. In this case, each CU shown in FIG. 10 may correspond to a parallel processing unit, and in this case, a parallel ME may be performed in a unit of CU. However, the following embodiments of FIG. 10 may equally apply to each of CU belonging to a parallel processing level even if the size of the MER, that is, the parallel processing level, is greater than the CU.

Meanwhile, as described above with reference to FIG. 9, within an MER for which a parallel ME is performed, there may be a PU using another block (and/or PU) for which encoding/decoding is not complete. In this case, the ME cannot be performed simultaneously for PUs belonging to the MER. Therefore, in order to solve this problem, an encoder and a decoder may not use a block, of which motion information is not available, as a merging candidate block. That is, the encoder and the decoder may handle the block as being not available in a process of deriving a merging candidate, and may not add the motion information of the block to a merging candidate list.

In 1010 of FIG. 10, a partitioning mode of a CU (and/or PU) is 2N×N, and merging candidates of a lower PU have a partition index 1. In this case, among blocks $A_0, A_1, B_0, B_1$, and $B_2$ used as a merging candidate block, the block $B_1$ is a block belonging to another PU in the same CU. Therefore, since the block $B_1$ is a block which cannot be used in a parallel ME, it may be handled as being not available, and may not be used as a merging candidate block of the lower PU. In this case, motion information of the block may not be added to the merging candidate list.

In addition, in the ME of the lower PU having the partition index 1, motion information of the block $A_0$ and the block $B_0$ may be not available. This is because it may be a state where encoding and/or decoding of the blocks is not complete according to a encoding/decoding order. In this case, since the block $A_0$ and the block $B_0$ are blocks which cannot be used in the parallel ME, the blocks may be handled as being not available, and may not be used as a merging candidate block of the lower PU. In this case, motion information of the block may not be added to the merging candidate list.

As shown in the embodiment of 1010 of FIG. 10, if the blocks which cannot be used in the parallel ME are handled as being not available, the number of spatial merging candidates derived for the lower PU having the partition index 1 may be 2. In this case, if 1 is added to the number of the spatial merging candidates by considering a temporal merging candidate, the maximum number of available merging candidates derived for the lower PU may be 3.

In 1020 of FIG. 10, a partitioning mode of a CU (and/or PU) is 2N×nU, and merging candidates of a lower PU have a partition index 1. In this case, among blocks $A_0, A_1, B_0, B_1$, and $B_2$ used as a merging candidate block, the block $B_1$ is a block belonging to another PU in the same CU. Therefore, since the block $B_1$ is a block which cannot be used in a parallel ME, it may be handled as being not available, and may not be used as a merging candidate block of the lower PU. In this case, motion information of the block may not be added to the merging candidate list.

In addition, in the ME of the lower PU having the partition index 1, motion information of the block $A_0$ and the block $B_0$ may be not available. This is because it may be a state where encoding and/or decoding of the blocks is not complete according to a encoding/decoding order. In this case, since the block $A_0$ and the block $B_0$ are blocks which cannot be used in the parallel ME, the blocks may be handled as being not available, and may not be used as a merging candidate block of the lower PU. In this case, motion information of the block may not be added to the merging candidate list.

As shown in the embodiment of 1020 of FIG. 10, if the blocks which cannot be used in the parallel ME are handled as being not available, the number of spatial merging candidates derived for the lower PU having the partition index 1 may be 2. In this case, if 1 is added to the number of the spatial merging candidates by considering a temporal merging candidate, the maximum number of available merging candidates derived for the lower PU may be 3.

In 1030 of FIG. 10, a partitioning mode of a CU (and/or PU) is 2N×nD, and merging candidates of a lower PU have a partition index 1. In this case, among blocks $A_0, A_1, B_0, B_1$, and $B_2$ used as a merging candidate block, the block $B_1$ is a block belonging to another PU in the same CU. Therefore, since the block $B_1$ is a block which cannot be used in a parallel ME, it may be handled as being not available, and may not be used as a merging candidate block of the lower PU. In this case, motion information of the block may not be added to the merging candidate list.

In addition, in the ME of the lower PU having the partition index 1, motion information of the block $A_0$ and the block $B_0$ may be not available. This is because it may be a state where encoding and/or decoding of the blocks is not complete according to a encoding/decoding order. In this case, since the block $A_0$ and the block $B_0$ are blocks which cannot be used in the parallel ME, the blocks may be handled as being not available, and may not be used as a merging candidate block of the lower PU. In this case, motion information of the block may not be added to the merging candidate list.

As shown in the embodiment of 1030 of FIG. 10, if the blocks which cannot be used in the parallel ME are handled as being not available, the number of spatial merging candidates derived for the lower PU having the partition index 1 may be 2. In this case, if 1 is added to the number of the spatial merging candidates by considering a temporal merging candidate, the maximum number of available merging candidates derived for the lower PU may be 3.

In 1040 of FIG. 10, a partitioning mode of a CU (and/or PU) is N×2N, and merging candidates of a right PU have a partition index 1. In this case, among blocks $A_0, A_1, B_0, B_1$, and $B_2$ used as a merging candidate block, the block $A_1$ is a block belonging to another PU in the same CU. Therefore, since the block $A_1$ is a block which cannot be used in a parallel ME, it may be handled as being not available, and may not be used as a merging candidate block of the lower PU. In this case, motion information of the block may not be added to the merging candidate list.

In addition, in the ME of the right PU having the partition index 1, motion information of the block $A_0$ may be not available. This is because it may be a state where encoding and/or decoding of the blocks is not complete according to a encoding/decoding order. In this case, since the block $A_0$ is a block which cannot be used in the parallel ME, the block may be handled as being not available, and may not be used as a merging candidate block of the right PU. In this case, motion information of the block may not be added to the merging candidate list.

As shown in the embodiment of 1040 of FIG. 10, if the blocks which cannot be used in the parallel ME are handled as being not available, the number of spatial merging candidates derived for the right PU having the partition index 1 may be 3. In this case, if 1 is added to the number of the spatial merging candidates by considering a temporal merging candidate, the maximum number of available merging candidates derived for the right PU may be 4.

In 1050 of FIG. 10, a partitioning mode of a CU (and/or PU) is nL×2N, and merging candidates of a right PU have a partition index 1. In this case, among blocks $A_0, A_1, B_0, B_1$, and $B_2$ used as a merging candidate block, the block $A_1$ is a block belonging to another PU in the same CU. Therefore, since the block $A_1$ is a block which cannot be used in a parallel ME, it may be handled as being not available, and may not be used as a merging candidate block of the right PU. In this case, motion information of the block may not be added to the merging candidate list.

In addition, in the ME of the right PU having the partition index 1, motion information of the block $A_0$ may be not available. This is because it may be a state where encoding and/or decoding of the blocks is not complete according to a encoding/decoding order. In this case, since the block $A_0$ is a block which cannot be used in the parallel ME, the block may be handled as being not available, and may not be used as a merging candidate block of the right PU. In this case, motion information of the block may not be added to the merging candidate list.

As shown in the embodiment of 1050 of FIG. 10, if the blocks which cannot be used in the parallel ME are handled as being not available, the number of spatial merging candidates derived for the right PU having a partition index 1 may be 3. In this case, if 1 is added to the number of the spatial merging candidates by considering a temporal merging candidate, the maximum number of available merging candidates derived for the right PU may be 4.

In 1060 of FIG. 10, a partitioning mode of a CU (and/or PU) is nR×2N, and merging candidates of a right PU have a partition index 1. In this case, among blocks $A_0, A_1, B_0, B_1$, and $B_2$ used as a merging candidate block, the block $A_1$ is a block belonging to another PU in the same CU. Therefore, since the block $A_1$ is a block which cannot be used in a parallel ME, it may be handled as being not available, and may not be used as a merging candidate block of the right PU. In this case, motion information of the block may not be added to the merging candidate list.

In addition, in the ME of the right PU having the partition index 1, motion information of the block $A_0$ may be not available. This is because it may be a state where encoding and/or decoding of the blocks is not complete according to a encoding/decoding order. In this case, since the block $A_0$ is a block which cannot be used in the parallel ME, the block may be handled as being not available, and may not be used as a merging candidate block of the right PU. In this case, motion information of the block may not be added to the merging candidate list.

As shown in the embodiment of 1060 of FIG. 10, if the blocks which cannot be used in the parallel ME are handled as being not available, the number of spatial merging candidates derived for the right PU having the partition index 1 may be 3. In this case, if 1 is added to the number of the spatial merging candidates by considering a temporal merging candidate, the maximum number of available merging candidates derived for the right PU may be 4.

According to the aforementioned embodiment, in the process of deriving a spatial merging candidate, an encoder and a decoder may handle a neighboring block of a PU as being not available on the basis of a specific condition. This can be expressed as follows.

If one of the following conditions is ture, the availableFlagN is set equal to 0, both components mvLXN are set equal to 0, refIdxLXN and predFlagLX[xN, yN] of the prediction unit covering luma location (xN, yN) are assigned respectively to mvLXN, refIdxLXN and predFlagLXN.

Herein, availableFlagN is a flag indicating whether a block N (where N is one of $A_0, A_1, B_0, B_1$, and $B_2$) is an available block which can be used as a merging candidate block. In addition, mvLXN denotes a motion vector of the block N, and refIdxLXN denotes a reference picture index of the block N. Herein, X may have a value of 0 or 1. In addition, predFlagLXN may correspond to a flag indicating whether an LX prediction is performed on the block N.

There may be several types of the condition for handling the neighboring block of the PU as being not available. For example, if the block N is a block $B_2$, and the blocks $A_0$, $A_1$, $B_0$, and $B_1$ are all available, to maintain the number of merging candidates to 5, it may be handled that the block $B_2$ is not available. In addition, if a prediction mode of the neighboring block is an intra mode, it may be handled that the block is not available. This may be expressed as follows.

N is equal to $B_2$ and availableFlag$A_0$+availableFlag$A_1$+availableFlag$B_0$+availableFlag$B_1$ is equal to 4.

The prediction unit covering luma location (xN, yN) is not available or PredMode is MODE_INTRA.

In addition, as described in the aforementioned embodiment, if a partitioning mode of a current CU (and/or PU) is 2N×N, 2N×nU, or 2N×nD, and a partition index of a current PU is 1, the block $B_1$ may be handled as being not available. In addition, if the partitioning mode of the current CU (and/or PU) is N×2N, nL×2N, or nR×2N, and the partition index of the current PU is 1, the block $A_1$ may be handled as being not available. This can be expressed as follows.

PartMode of the current prediction unit is PART_2N×N or PART_2N×nU or PART_2N×nD and PartIdx is equal to 1 and N is equal to B1

PartMode of the current prediction unit is PART_N×2N or PART_nL×2N or PART_nR×2N and PartIdx is equal to 1 and N is equal to A1

The aforementioned last two conditions may enable a parallel ME for all PUs belonging to the same CU by allowing PUs belonging to the same CU not to have a dependency with each other. In addition, if one PU uses motion information belonging to another PU in the same CU, rectangular PUs in the same CU have the same motion information and thus may eventually have the same motion information as in the 2N×2N partitioning mode. In this case, the aforementioned last two conditions may prevent the rectangular PUs from having the same motion information as in the 2N×2N partitioning mode.

Figure 11:
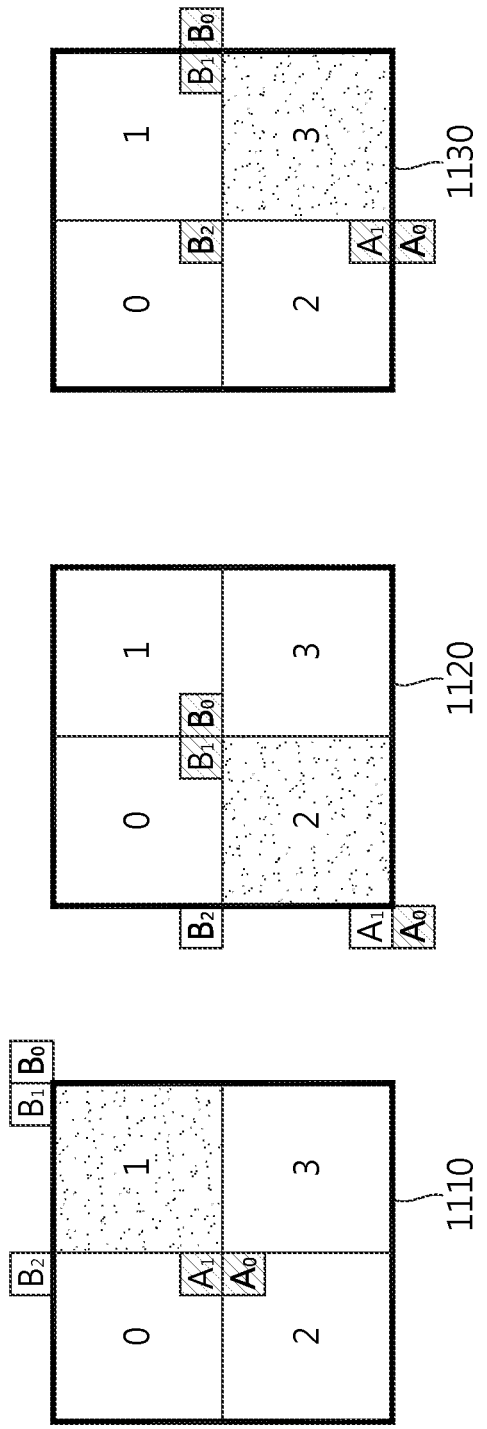
FIG. 11 is a schematic view showing another embodiment of a method of deriving a merging candidate for enabling a parallel ME.

FIG. 11 is a schematic view showing another embodiment of a method of deriving a merging candidate for enabling a parallel ME. 1110 to 1130 of FIG. 11 each indicates one CU, and a number marked in a PU belonging to each CU denotes a partition index.

For convenience of explanation, it is assumed in the embodiment of FIG. 11 that an MER has the same size as a current CU. In this case, each CU shown in FIG. 11 may correspond to a parallel processing unit, and in this case, a parallel ME may be performed in a unit of CU. However, the following embodiments of FIG. 11 may equally apply to each of CU belonging to a parallel processing level even if the size of the MER, that is, the parallel processing level, is greater than the CU.

Meanwhile, the embodiment of FIG. 10 described above is for a case where a partitioning mode of a CU (and/or PU) is 2N×N, 2N×nU, 2N×nD, N×2N, nL×2N, and nR×2N. However, even if the partitioning mode of the CU (and/or PU) is N×N, within an MER for which a parallel ME is performed, there may be a PU using another block (and/or PU) for which encoding/decoding is not complete. In this case, the ME cannot be performed simultaneously for PUs belonging to the MER. Therefore, in order to solve this problem, an encoder and a decoder may not use motion information of a block, of which motion information is not available, as a merging candidate block. That is, the encoder and the decoder may handle the block as being not available in a process of deriving a merging candidate, and may not add the motion information of the block to a merging candidate list.

In 1110 of FIG. 11, a partitioning mode of a CU (and/or PU) is N×N, and merging candidates of a right upper PU have a partition index 1. In this case, among blocks $A_0$, $A_1$, $B_0$, $B_1$, and $B_2$ used as a merging candidate block, the block $A_0$ and the block $A_1$ are blocks belonging to another PU in the same CU. In this case, the right upper PU has a dependency with another PU in the same CU. Therefore, since the block $A_0$ and the block $A_1$ are blocks which cannot be used in a parallel ME, it may be handled as being not available, and may not be used as a merging candidate block of the right upper PU. In this case, motion information of the block may not be added to the merging candidate list.

As shown in the embodiment of 1110 of FIG. 11, if the blocks which cannot be used in the parallel ME are handled as being not available, the number of spatial merging candidates derived for the right upper PU having the partition index 1 may be 3. In this case, if 1 is added to the number of the spatial merging candidates by considering a temporal merging candidate, the maximum number of available merging candidates derived for the right upper PU may be 4.

In 1120 of FIG. 11, a partitioning mode of a CU (and/or PU) is N×N, and merging candidates of a left lower PU have a partition index 2. In this case, among blocks $A_0$, $A_1$, $B_0$, $B_1$, and $B_2$ used as a merging candidate block, the block $B_0$ and the block $B_1$ are blocks belonging to another PU in the same CU. In this case, the left lower PU has a dependency with another PU in the same CU. Therefore, since the block $B_0$ and the block $B_1$ are blocks which cannot be used in a parallel ME, it may be handled as being not available, and may not be used as a merging candidate block of the left lower PU. In this case, motion information of the block may not be added to the merging candidate list.

In addition, in the ME of the left lower PU having the partition index 2, motion information of the block $A_0$ may be not available. This is because it may be a state where encoding and/or decoding of the blocks is not complete according to a encoding/decoding order. In this case, since the block $A_0$ is a block which cannot be used in a parallel ME, the blocks may be handled as being not available, and may not be used as a merging candidate block of the left lower PU. In this case, motion information of the block may not be added to the merging candidate list.

As shown in the embodiment of 1120 of FIG. 11, if the blocks which cannot be used in the parallel ME are handled as being not available, the number of spatial merging candidates derived for the left lower PU having the partition index 2 may be 2. In this case, if 1 is added to the number of the spatial merging candidates by considering a temporal merging candidate, the maximum number of available merging candidates derived for the left lower PU may be 3.

In 1130 of FIG. 11, a partitioning mode of a CU (and/or PU) is N×N, and merging candidates of a right lower PU have a partition index 3. In this case, among blocks $A_0$, $A_1$, $B_0$, $B_1$, and $B_2$ used as a merging candidate block, the block $A_1$, the block $B_1$, and the block $B_2$ are blocks belonging to another PU in the same CU. In this case, the right lower PU has a dependency with another PU in the same CU. Therefore, since the block $A_1$, the block $B_1$, and the block $B_2$ are blocks which cannot be used in a parallel ME, it may be handled as being not available, and may not be used as a merging candidate block of the right lower PU. In this case, motion information of the block may not be added to the merging candidate list.

In addition, in the ME of the right lower PU having the partition index 3, motion information of the block $A_0$ and the block $B_0$ may be not available. This is because it may be a state where encoding and/or decoding of the blocks is not complete according to a encoding/decoding order. In this case, since the block $A_0$ and the block $B_0$ are blocks which cannot be used in the parallel ME, the blocks may be handled as being not available, and may not be used as a merging candidate block of the right lower PU. In this case, motion information of the block may not be added to the merging candidate list.

As shown in the embodiment of 1130 of FIG. 11, if the blocks which cannot be used in the parallel ME are handled as being not available, the number of spatial merging candidates derived for the right lower PU having the partition index 3 may be 0. In this case, if 1 is added to the number of the spatial merging candidates by considering a temporal merging candidate, the maximum number of available merging candidates derived for the right lower PU may be 1.

According to the aforementioned embodiment, in the process of deriving a spatial merging candidate, an encoder and a decoder may handle a neighboring block of a PU as being not available on the basis of a specific condition. As described above with reference to FIG. 10, there may be several types of the condition for handling the neighboring block of the PU as being not available.

According to the embodiment of FIG. 11, if a partitioning mode of a current CU (and/or PU) is N×N and a partition index of a current PU is 1, the block $A_0$ and the block $A_1$ may be handled as being not available. In addition, if the partitioning mode of the current CU (and/or PU) is N×N and the partition index of the current PU is 2, the block $B_0$ and the block $B_1$ may be handled as being not available. In addition, if the partitioning mode of the current CU (and/or PU) is N×N and the partition index of the current PU is 3, the block $A_1$, the block $B_1$, and the block $B_2$ may be handled as being not available. The aforementioned three conditions may be added as follows in the embodiment described in FIG. 10.

If one of the following conditions is ture, the availableFlagN is set equal to 0, both components mvLXN are set equal to 0, refIdxLXN and predFlagLX[xN, yN] of the prediction unit covering luma location (xN, yN) are assigned respectively to mvLXN, refIdxLXN and predFlagLXN.
  N is equal to $B_2$ and availableFlag$A_0$+availableFlag$A_1$+availableFlag$B_0$+availableFlag$B_1$ is equal to 4.
  The prediction unit covering luma location (xN, yN) is not available or PredMode is MODE_INTRA.
  PartMode of the current prediction unit is PART_2N×N or PART_2N×nU or PART_2N×nD and PartIdx is equal to 1 and N is equal to B1
  PartMode of the current prediction unit is PART_N×2N or PART_nL×2N or PART_nR×2N and PartIdx is equal to 1 and N is equal to A1
  PartMode of the current prediction unit is PART_N×N and PartIdx is equal to 1 and N is equal to A0 or A1
  PartMode of the current prediction unit is PART_N×N and PartIdx is equal to 2 and N is equal to B0 or B1
  PartMode of the current prediction unit is PART_N×N and PartIdx is equal to 3 and N is equal to A1 or B1 or B2

The three conditions added in the aforementioned embodiment may prevent one PU belonging to a CU from referring to motion information of another PU belonging to the same CU. Therefore, according to the aforementioned embodiment, spatial merging candidates can be derived in parallel for all PUs belonging to the same CU.

Meanwhile, if the aforementioned embodiments of FIG. 10 and FIG. 11 are applied in a parallel merge mode and/or a parallel skip mode, the maximum number of available merging candidates which can be derived for each PU may be estimated according to a partitioning mode and a partition index. The maximum number of available merging candidates for each PU may be estimated by adding the number of temporal candidates (e.g., 1) to the number of available spatial merging candidates which can be used in a parallel ME. For example, in each partitioning mode of FIG. 10 and FIG. 11, up to 5 available merging candidates may be derived for a PU having a partition index value 0. For another example, in a partitioning mode of 2N×N as shown in 1010 of FIG. 10, up to 3 available merging candidates may be derived for a PU having a partition index 1. The maximum number of available merging candidates derived for each PU may be expressed by Table 3 below according to the partitioning mode and the partition index.

TABLE 3

| PartMode | 2Nx2N | 2NxN | 2NxN | Nx2N | Nx2N | NxN | NxN | NxN | NxN |
|---|---|---|---|---|---|---|---|---|---|
| partIdx | 0 | 0 | 1 | 0 | 1 | 0 | 1 | 2 | 3 |
| maxNumMergeCand | 5 | 5 | 3 | 5 | 4 | 5 | 4 | 3 | 1 |

| PartMode | 2NxnU | 2NxnU | 2NxnD | 2NxnD | nLx2N | nLx2N | nRx2N | nRx2N |
|---|---|---|---|---|---|---|---|---|
| partIdx | 0 | 1 | 0 | 1 | 0 | 1 | 0 | 1 |
| maxNumMergeCand | 5 | 3 | 5 | 3 | 5 | 4 | 5 | 4 |

Herein, PartMode denotes a partitioning mode of a CU (or PU), and partIdx denotes a partition index of a PU. In addition, maxNumMergeCand denotes the maximum number of available merging candidates derived for a corresponding PU.

However, if the number of merging candidates is limited to 5 as described above with reference to FIG. 7, the merge index indicates one of the 5 merging candidates. In this case, a bit amount corresponding to the 5 merging candidates may be used to transmit the merge index. However, as described above, the maximum number of available merging candidates derived from the PU may be less than 5, and in this case, a bit amount required to transmit the merge index may be less than the bit amount corresponding to the 5 merging candidates. That is, an actual bit amount required for transmission of the merge index may be decreased in proportion to the number of blocks handled as being not available. In this case, when a bit in use exceeds the actual bit amount required for transmission of the merge index, the bit may be regarded as being wasted with respect to the merge index.

To solve the aforementioned problem, an encoder and a decoder may perform encoding/decoding on a merge index by applying the number of merging candidates optimized according to the partitioning mode and the partition index, thereby being able to decrease or save a bit amount which can be used for transmission of the merge index.

In one embodiment, a table such as Table 3 may be stored in the encoder and the decoder. In this case, the encoder may determine the maximum number of available merging candidates derived for any PU according to the partitioning mode and the partition index on the basis of the aforementioned table. In addition, the encoder may encode the merge index for the PU on the basis of the maximum number and may transmit the encoded merge index to the decoder. In this case, only a bit amount corresponding to the maximum number is used in transmission of the merge index, and thus a bit amount used in transmission of the merge index may be decreased. Since the table is equally stored in the decoder, the maximum number of available merging candidates derived for any PU may be determined in the same method as that used in the encoder. In this case, on the basis of the maximum number, the decoder may decode the merge index transmitted from the encoder.

Meanwhile, referring to 1130 of FIG. 11 and Table 2, if the partitioning mode of the CU (and/or PU) is N×N and the partition index value of the PU belonging to the CU is 3, only one temporal merging candidate may correspond to an available merging candidate belonging to the PU. In this case, the maximum number of available merging candidates derived for the PU may be 1. If the maximum number of available merging candidates is 1, the decoder may know which merging candidate is used to derive motion information of the PU without having to use the merge index. Accordingly, if the partitioning mode of the CU (and/or PU) is N×N and the partition index of the PU belonging to the CU is 3, the encoder may not transmit a merge index for the PU to the decoder.

Figure 12:
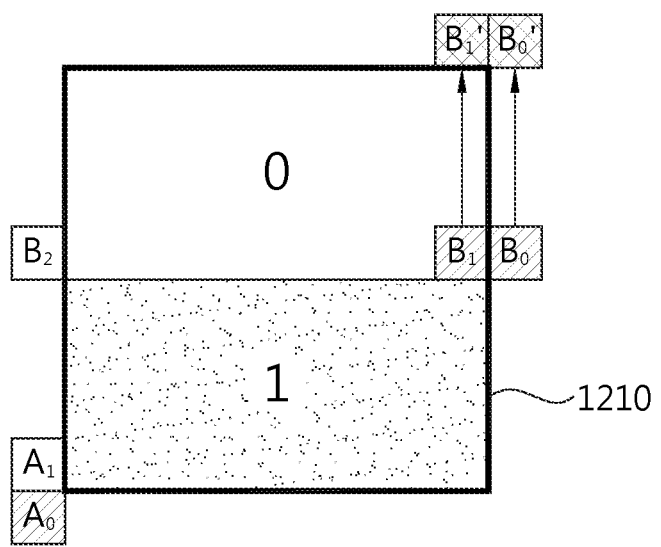
FIG. 12 is a schematic view showing another embodiment of a method of deriving a merging candidate for enabling a parallel ME.

FIG. 12 is a schematic view showing another embodiment of a method of deriving a merging candidate for enabling a parallel ME. 1210 of FIG. 12 indicates one CU, and a number marked in a PU belonging to each CU denotes a partition index.

For convenience of explanation, it is assumed in the embodiment of FIG. 12 that an MER has the same size as a current CU. In this case, each CU shown in FIG. 12 may correspond to a parallel processing unit, and in this case, a parallel ME may be performed in a unit of CU. However, the following embodiments of FIG. 12 may equally apply to each of CU belonging to a parallel processing level even if the size of the MER, that is, the parallel processing level, is greater than the CU.

In the aforementioned embodiments of FIG. 10 and FIG. 11, merging candidates corresponding to a block of which motion information is not available when performing the parallel ME may be handled as being not available and thus may not be added to the merging candidate list. In this case, the merging candidates handled as being not available may be replaced with a merging candidate which is used when a partitioning mode of a current CU (and/or PU) is 2N×2N.

In 1210 of FIG. 12, the partitioning mode of the current CU (and/or PU) is 2N×N, and the PU for which the ME is performed at present is a lower PU having a partition index 1. In this case, as described above with reference to FIG. 10, among blocks $A_0$, $A_1$, $B_0$, $B_1$, and $B_2$ used as a merging candidate block, the block $A_0$, the block $B_0$, and the block $B_1$ are blocks which cannot be used in the parallel ME, and thus may be handled as being not available.

However, if the partitioning mode of the current CU (and/or PU) is 2N×2N, a block $B_0'$ (i.e., a block closest in location to a right upper corner outside the current CU) and a block $B_1'$ (i.e., a block closest in location to a rightmost side among blocks adjacent to an upper portion of the current CU) may have available motion information when performing the parallel ME. Therefore, the encoder and the decoder may use the block $B_0'$ as a merging candidate block of a lower PU instead of the block $B_0$, and may use the block $B_1'$ as a merging candidate block of a lower PU instead of the block $B_1$.

Although the aforementioned embodiment is limited to a case where the partitioning mode of the current CU (and/or PU) is 2N×N, the present invention is not limited thereto. That is, the aforementioned method of deriving the merging candidate may similarly apply to a case where the partitioning mode of the current CU is N×2N, N×N, 2N×nU, 2N×nD, nL×2N, or nR×2N.

Meanwhile, the encoder and the decoder may derive and use a common merging candidate and/or a common merging candidate list in regards to a plurality of PUs for which the parallel ME is performed, thereby enabling the parallel ME. A parallel ME method based on the common merging candidate and/or the common merge list may be applied independently with respect to the aforementioned embodiment of FIG. 10 and/or FIG. 11, or may also be applied to the encoder/decoder in association with the embodiment of FIG. 10 and/or FIG. 11. Hereinafter, in the present invention, a merging candidate used commonly for a plurality of PUs is called a 'common merging candidate', and a merging candidate list used commonly for the plurality of PUs is called a 'single merging candidate list'.

In this case, a unit by which the common merging candidate and/or the single merging candidate list are derived may be a predetermined specific unit. Herein, the specific unit may be determined by a number, and may be a CU, an MER, and/or an LCU. In addition, the unit by which the common merging candidate and/or the single merging candidate list are derived may be determined in the encoder. In this case, the encoder may encode information on the unit and transmit it to the decoder. In this case, the decoder may determine the unit by which the common merging candidate and/or the single merging candidate list are derived, on the basis of the transmitted information. Hereinafter, in the present invention, the aforementioned unit by which the common merging candidate and/or the single merging candidate list are derived is called a 'merging candidate sharing unit'.

For example, if the merging candidate sharing unit is the CU, all PUs (i.e., PUs having a merge mode and/or a skip mode) in one CU may share a common merging candidate for the CU and/or a single merge sharing list for the CU. In this case, if the partitioning mode of the CU (and/or PU belonging to the CU) is 2N×2N, the single merging candidate list may be the same as the merging candidate list of the PU belonging to the CU. For another example, if the merging candidate sharing unit is the LCU, all PUs (i.e., PUs having the merge mode and/or the skip mode) in one LCU may share a common merging candidate for the LCU and/or the single merging candidate list for the LCU. For another example, if the merging candidate sharing unit is the MER, all PUs (i.e., PUs having the merge mode and/or the skip mode) in one MER may share the common merging candidate for the MER and/or the single merging candidate list for the MER.

If all PUs in one merging candidate sharing unit share the common merging candidate and/or the single merging candidate list, a coding loss may occur to some extent. Therefore, the encoder and the decoder may selectively determine the merging candidate deriving method and/or the merging candidate list deriving method on the basis of a merging candidate sharing flag. Herein, the merging candidate sharing flag may correspond to a flag for indicating whether the single merging candidate list is derived and used for all PUs in the merging candidate sharing unit or whether an individual merging candidate list is derived and used for each PU. The merging candidate sharing flag may be denoted, for example, by parallel_merge_cand_flag, parallel_merge_derivation_flag, or singleMCLFlag.

For example, if a value of the merging candidate sharing flag is 1, the flag may indicate that the all PUs in the merging candidate sharing unit share the common merging candidate and/or the single merging candidate list. That is, in this case, the flag may indicate that a location of a merging candidate (i.e., spatial merging candidate and/or temporal merging candidate) is identical for all PUs in the merging candidate sharing unit. In addition, if the merging candidate sharing flag is 0, the flag may indicate that an individual merging candidate list is derived and used for each PU.

For example, the aforementioned merging candidate sharing flag may be a flag which is encoded by the encoder and is transmitted to the decoder. In this case, the merging candidate sharing flag may be defined in an SPS, a PPS, an adaptation parameter set (APS), or a slice header. That is, the merging candidate sharing flag may be included in the aforementioned SPS, PPS, APS, or slice header and may be transmitted from the encoder to the decoder. In this case, the decoder may determine the merging candidate deriving method and/or the merging candidate deriving method on the basis of the transmitted flag.

In another embodiment, a value corresponding to the merging candidate sharing flag may be derived by using the same method as that used in the encoder and the decoder. In this case, the encoder may not transmit information related to the merging candidate sharing flag to the decoder.

For example, it is assumed that the merging candidate sharing unit is a CU. In this case, a value assigned to the merging candidate sharing flag may be determined on the basis of a size of an MER and/or a size of a current CU. For example, the encoder and the decoder may assign a value 1 to the merging candidate sharing flag only when the size of the MER, that is, a parallel processing level, is greater than 4×4, and a size of the current CU is 8×8. Herein, if the value of the merging candidate sharing flat is 1, the flag may indicate that all PUs in the merging candidate sharing unit share a common merging candidate and/or a single merging candidate list. That is, the encoder and the decoder may allow all PUs in the current CU to be able to share the common merging candidate and/or the single merging candidate list only when the parallel processing level is greater than 4×4 and the size of the current CU is 8×8. In this case, if the parallel processing level is 4×4 or the size of the current CU is not 8×8, a value 0 may be assigned to the merging candidate sharing flag. Herein, if the value of the merging candidate sharing flat is 0, the flag may indicate that an individual merging candidate list is derived and used for each PU.

Hereinafter, a method of deriving a common merging candidate for PUs in a merging candidate sharing unit will be described according to an embodiment of the present invention.

Figure 13:
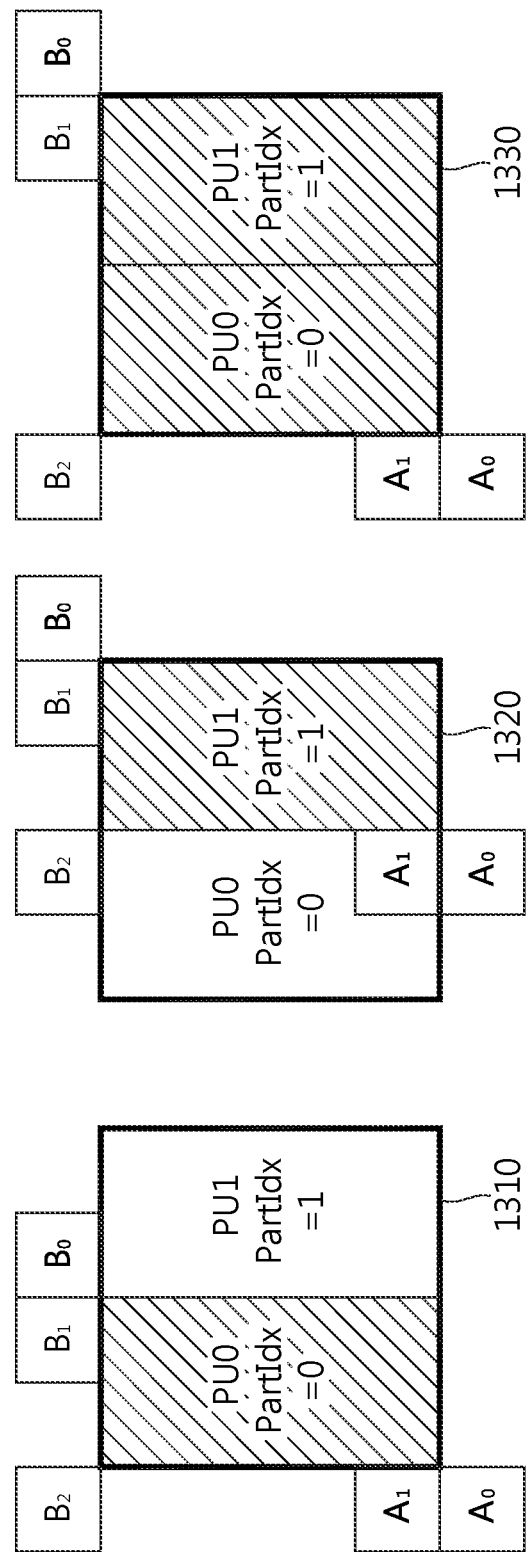
FIG. 13 is a schematic view showing an embodiment of a method of deriving a common merging candidate for prediction units (PUs) in a merging candidate sharing unit.

FIG. 13 is a schematic view showing an embodiment of a method of deriving a common merging candidate for PUs in a merging candidate sharing unit.

1310 to 1330 of FIG. 13 each indicates one identical CU, and a partitioning mode of the CU (and/or PU) corresponds to N×2N. In addition, PartIdx denotes a partition index, PU0 denotes a PU of which a partition index value is 0, and PU1 denotes a PU of which a partition index value is 1.

Meanwhile, for convenience of explanation, it is assumed in the embodiment of FIG. 13 that a merging candidate sharing unit is a CU. In this case, each CU of FIG. 13 may correspond to the merging candidate sharing unit. A size of the merging candidate sharing unit may be the same as or different from an MER, i.e., a size of a parallel processing unit.

1310 of FIG. 13 indicates merging candidates of a left PU having a partition index 0. In addition, 1320 of FIG. 13 indicates merging candidates of a right PU having a partition index 1. Referring to 1310 and 1320 of FIG. 13, each of PUs in the CU (i.e., merging candidate sharing unit) may have an independent merging candidate list.

In this case, a block $A_1$ in 1320 of FIG. 13 may be a block belonging to a right PU. Therefore, since the right PU uses motion information belonging to the left PU, an ME may be performed simultaneously for the left PU and the right PU. In this case, the encoder and the decoder may enable a parallel ME by handling the block $A_1$ as being not available, and may also enable the parallel ME by using motion information of a block having available motion information as a common merging candidate.

Referring to 1330 of FIG. 13, PUs in a CU (i.e., merging candidate sharing unit) may have a common merging candidates (and/or a common merging candidate list). That is, all PUs in the CU in 1330 of FIG. 13 may have a common merging candidate (and/or single merging candidate list).

Herein, for example, the common merging candidate may be the same as the merging candidate derived when a partitioning mode of the current CU 1330 is 2N×2N. More specifically, the encoder and the decoder may use motion information of a block $A_0$ closest in location to a left lower corner outside the CU 1330, a block $A_1$ located in a lowermost portion among blocks adjacent to a left side of the CU 1330, a block $B_0$ closest in location to a right upper corner outside the CU 1330, a block $B_1$ located in a rightmost side among blocks adjacent to an upper portion of the CU 1330, and a block $B_2$ closest in location to a left upper corner outside the CU 1330 as a common merging candidate for the left PU, i.e., PU0, and the right PU, i.e., PU1.

In the aforementioned embodiment of 1330 of FIG. 13, all PUs in one CU (i.e., merging candidate sharing unit) may share a common merging candidate (i.e., merging candidate derived when the partitioning mode of the current CU 1330 is 2N×2N) and/or a single merging candidate list. That is, all PUs in the CU (i.e., merging candidate sharing unit) may use a co-located merging candidate. Therefore, the aforementioned method of deriving the common merging candidate may decrease a coding complexity and may facilitate a parallel ME.

The aforementioned common merging candidate deriving method is for one embodiment only, and thus the partitioning mode to which the common merging candidate deriving method is applied is not limited to N×2N. The aforementioned common merging candidate deriving method may be applied also in the same or similar manner to a case where a partitioning mode of a current CU (and/or PU) is a 2N×2N mode, a 2N×N mode, a N×N mode, a 2N×nU mode, a 2N×nD mode, a nL×2N mode, or a nR×2N mode. That is, all PUs in one CU may share a common merging candidate and/or a single merging candidate list irrespective of the partitioning mode of the CU (and/or PU). In this case, the encoder and the decoder may use a block, which exists in the same location as the merging candidate used when the partitioning mode of the CU (and/or PU) is 2N×2N, as the common merging candidate.

For example, even if the partitioning mode of the current CU (and/or PU) is the N×N mode, all PUs (i.e., a PU having a partition index 0, a PU having a partition index 1, a PU having a partition index 2, and a PU having a partition index 3) in the current CU may share the common merging candidate and/or the single merging candidate list. In addition, motion information of a block, which exists in the same location as a merging candidate block used when the partitioning mode of the current CU (and/or PU) is 2N×2N, may be derived as the common merging candidate.

In general, the merging candidate block and/or merging candidate of the PU may be specified by a relative location with respect to the PU. Therefore, merging candidates of one PU may be determined on the basis of a coordinate (e.g., (xP, yP)) located in a leftmost upper portion in the PU, a width (e.g., nPbW) of the PU, and a height (e.g., nPbH) of the PU.

However, if the common merging candidate and/or the single merging candidate list are used, the common merging candidate is the same as the merging candidate derived when the partitioning mode of the CU (and/or PU) is 2N×2N, and thus may be specified by a relative location with respect to the CU. Therefore, if the common merging candidate and/or the single merging candidate list are used, the encoder and the decoder may reconfigure a coordinate of a pixel located in a leftmost upper portion in the PU to a coordinate (e.g., (xC, yC)) of a pixel located in a leftmost upper portion in a CU to which the PU belongs. In addition, the encoder and the decoder may reconfigure a width of the PU and a height of the PU as a width (e.g., nCS) of the CU and a height of the CU (e.g., nCS). In this case, the decoder and the encoder may determine a merging candidate of a PU on the basis of the reconfigured value, so that the PU uses a common merging candidate in a parallel ME.

Meanwhile, as described above, if all PUs in one merging candidate sharing unit share the common merging candidate and/or the single merging candidate list, a coding loss may occur to some extent. Therefore, the encoder and the decoder may selectively determine the merging candidate deriving method and/or the merging candidate list deriving method on the basis of a merging candidate sharing flag.

For example, if a value of the merging candidate sharing flag is 1, the flag may indicate that the all PUs in the merging candidate sharing unit share the common merging candidate and/or the single merging candidate list. This may correspond to the common merging candidate deriving method shown in 1330 of FIG. 13. In addition, if the merging candidate sharing flag is 0, the flag may indicate that an individual merging candidate list is derived and used for each PU. This may correspond to the merging candidate deriving method shown in 1310 and 1320 of FIG. 13.

Since the merging candidate sharing flag is described above in detail, detailed descriptions thereof may be omitted herein.

Figure 14:
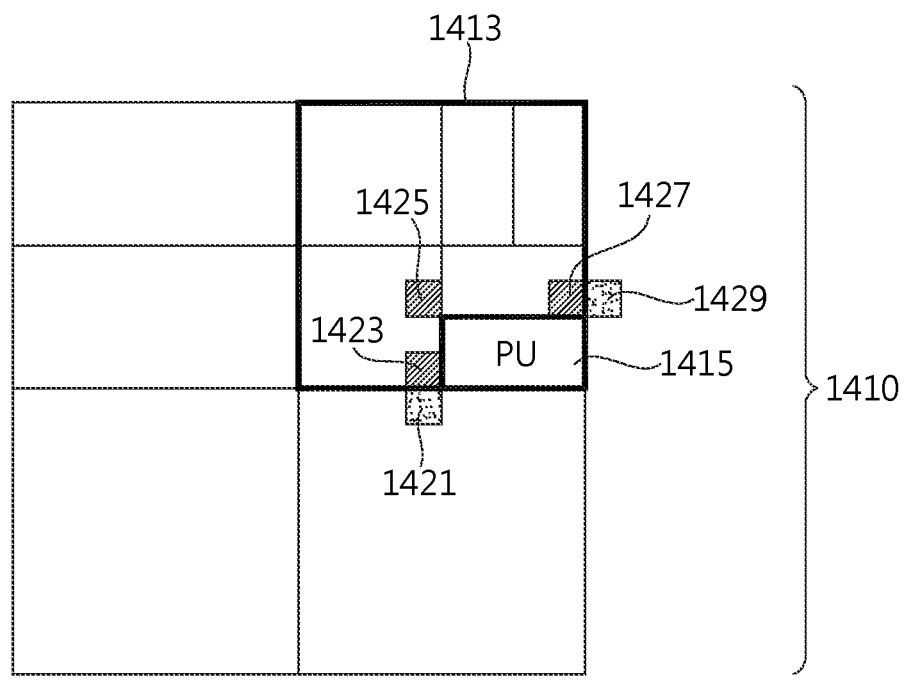
FIG. 14 is a schematic view showing another embodiment of a method of deriving a common merging candidate for PUs in a merging candidate sharing unit.
Figure 14:
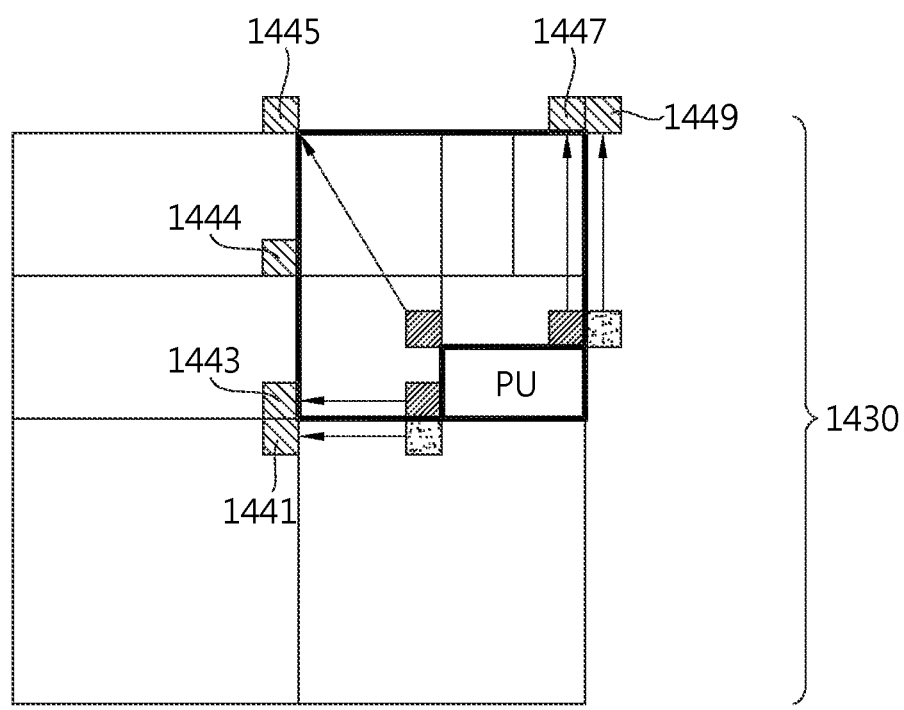

FIG. 14 is a schematic view showing another embodiment of a method of deriving a common merging candidate for PUs in a merging candidate sharing unit.

1410 and 1430 in FIG. 14 each indicates one LCU (and/or coding tree block). 1430 of FIG. 14 shows an LCU which is the same as the LCU shown in 1410 of FIG. 1410, and thus like constitutional elements may be indicated by like numeral references in 1410 and 1430 of FIG. 14.

Meanwhile, in the embodiment of FIG. 14, for convenience of explanation, it is assumed that one LCU consists of four square MERs having the same size, and a merging candidate sharing unit for a PU in the LCU is the same as the MER unit. In this case, the MER may have the same size as the CU or may have a size different from that of the CU according to a size of each CU constituting a coding tree block. In the embodiment of FIG. 14, since the MER corresponds to the merging candidate sharing unit, if the CU has the same size as the MER, the CU may correspond to the merging candidate sharing unit. For example, in a case where the MER size is 8×8, if a size of a current CU is 8×8, the current CU may correspond to a merging candidate sharing unit. Although the embodiment of FIG. 14 is described according to a case where the merging candidate sharing unit is the MER unit, the same or similar method may also apply to a case where the merging candidate sharing unit is the CU.

Referring to 1410 of FIG. 14, a current PU 1415 for which an ME is performed may be included in one MER 1413. Hereinafter, an MER to which the current PU 1415 belongs is called the MER 1413 in the embodiment of FIG. 14. In 1410 of FIG. 14, merging candidates 1421, 1423, 1425, 1427, and 1429 of the current PU 1415 are shown.

Among the blocks 1421, 1423, 1425, 1427, and 1429 used as merging candidate blocks, the blocks 1423, 1425, and 1427 are blocks belonging to the current MER 1413, and may be blocks which belong to the same MER as the current PU 1415. Therefore, the blocks 1423, 1425, and 1427 correspond to blocks for which encoding/decoding is not complete in a parallel ME, and thus cannot be used in a parallel ME of the current PU 1415. In addition, motion information of the blocks 1421 and 1429 may be not available in the ME of the current PU 1415. This is because it may be a state where the encoding and/or decoding of the blocks is complete according to a encoding/decoding order. Therefore, if a merge mode (and/or skip mode) ME is performed on the current PU, the aforementioned merging candidate blocks (i.e., a block belonging to the same MER as the current PU 1415 and/or a block for which the encoding/decoding is not complete in the parallel ME) may be handled as being not available.

In addition, as described above, the encoder and the decoder may enable the parallel ME by using the common merging candidate and/or the single merging candidate list with respect to a plurality of PUs in the merging candidate sharing unit.

Referring to 1430 of FIG. 14, PUs in an MER (i.e., merging candidate sharing unit) may have the common merging candidate (and/or single merging candidate list). That is, in 1430 of FIG. 14, all PUs in the MER may share the common merging candidate (e.g., the blocks 1441, 1443, 1445, 1447, and 1449). In this case, the current PU 1415 may use the common merging candidate instead of the merging candidates 1421, 1423, 1425, 1427, and 1429.

Herein, for example, the common merging candidate may be the same as a merging candidate which is derived when a CU (and/or PU belonging to the CU) having the same size as the current MER 1413 has a partitioning mode of 2N×2N. That is, the encoder and the decoder may use a block located outside the current MER 1413 as a common merging candidate, and the common merging candidate may be specified by a relative location with respect to the current MER 1413.

In one embodiment, the decoder and the decoder may use motion information of a block 1441 closest in location to a left lower corner outside the current MER 1413, a block 1443 located in a lowermost portion among blocks adjacent to a left side of the current MER 1413, a block 1449 closest in location to a right upper corner outside the current MER 1413, a block 1447 located in a rightmost side among blocks adjacent to an upper portion of the current MER 1413, and a block 1445 closest in location to a left upper corner outside the current MER 1413 as a merging candidate (i.e., common merging candidate) of the current PU 1415. In this case, if there is a block (e.g., the block 1449 closest in location to the right upper corner outside the current MER 1413) not having available motion information among the blocks, the encoder and the decoder may handle the corresponding block as being not available or may not use it as a merging candidate block of the current PU 1415. In another embodiment, the encoder and the decoder may use a block 1444 adjacent to a left side of the current MER 1413 as the merging candidate block of the current PU 1415, instead of the block 1445 closest in location to the left upper corner outside the current MER 1413. In this case, the block 1444 may be a block located in the center among blocks adjacent to the left side of the current MER 1413, or if the number of blocks located in the center is 2, may be a block located in an upper portion among the two blocks.

As shown in the embodiment of 1430 of FIG. 14, if a common merging candidate (and/or single merging candidate list) is used for all PUs in one merging candidate sharing unit, a block including available motion information may be used as a merging candidate block instead of a block handled as being not available. Therefore, in this case, a encoding/decoding performance may be improved in comparison with a case of not using the common merging candidate (and/or single merging candidate list).

As described above, the encoder and the decoder may use blocks adjacent to a PU (e.g., a block closest in location to a left lower corner outside the PU, a block located in a lowermost portion among blocks adjacent to a left side of the PU, a block closest in location to a right upper corner outside the PU, a block located in a rightmost side among blocks adjacent to an upper portion of the PU, and a block located outside an MER to which the PU belongs, as a merging candidate block of the PU. Hereinafter, in the present invention, in order to replace a merging candidate derived from the block adjacent to the PU, a merging candidate derived from the block located outside the MER to which the PU belongs is called an MER merging candidate.

The embodiment of FIG. 14 may be regarded as an embodiment of the MER merging candidate deriving method. In the embodiment of FIG. 14, all PUs in one merging candidate sharing unit may share a common merging candidate (and/or single merging candidate list). Therefore, in FIG. 14, all PUs in one MER (i.e., merging candidate sharing unit) may have the same MER merging candidate. The MER merging candidate may be derived as a common merging candidate for all PUs in one MER as shown in the embodiment of FIG. 14, and may be derived separately for each of the PUs included in one MER. In association therewith, embodiments of the MER merging candidate deriving method will be described additionally hereinafter.

Figure 15:
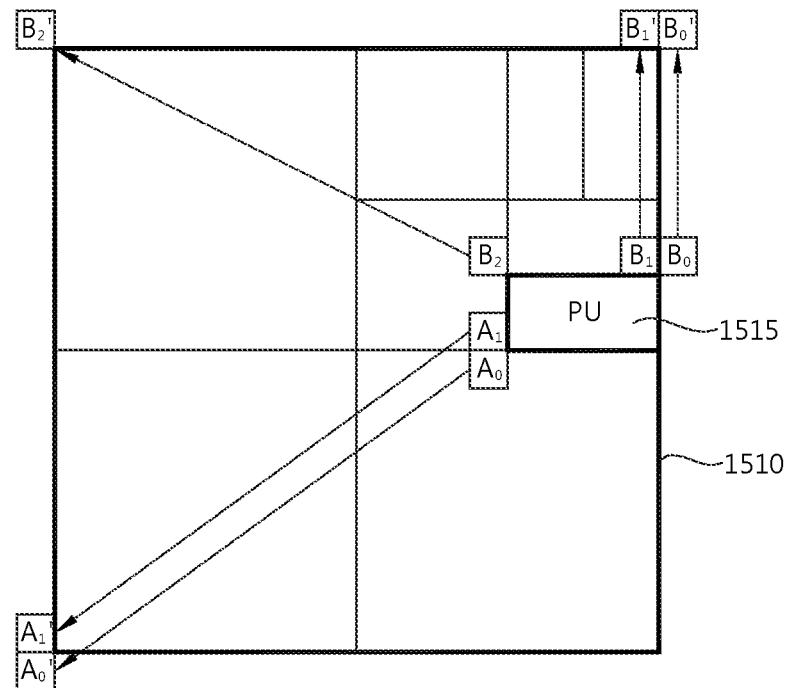
FIG. 15 is a schematic view showing an embodiment of a method of deriving a motion estimation region (MER) merging candidate.
Figure 15:
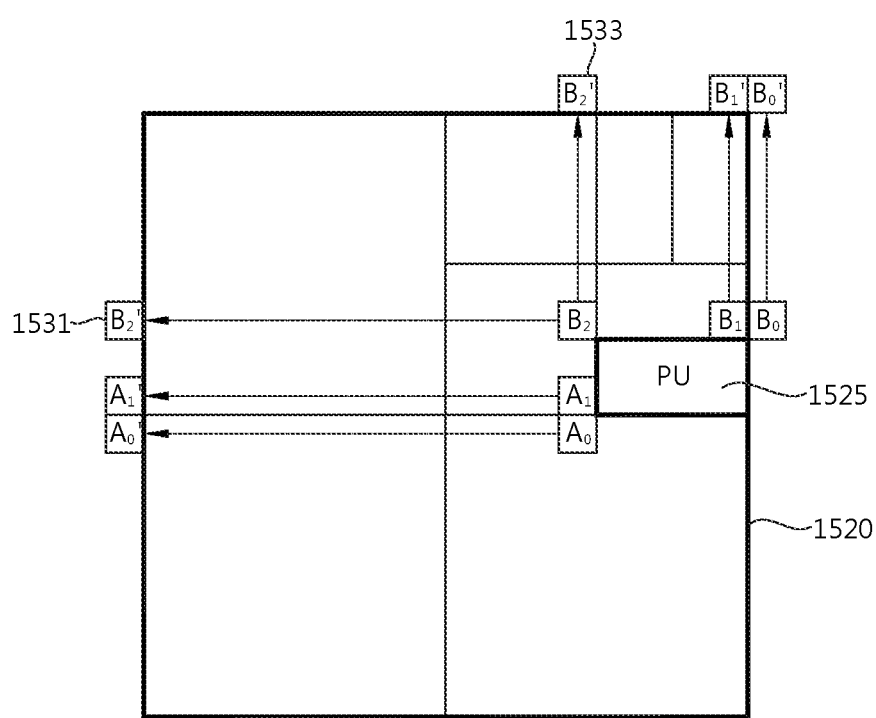

FIG. 15 is a schematic view showing an embodiment of a method of deriving an MER merging candidate. 1510 and 1520 of FIG. 15 each indicates one MER.

Referring to 1510 of FIG. 15, a current PU 1515 included in the current MER 1510 may have 5 spatial merging candidates $A_0, A_1, B_0, B_1$, and $B_2$. However, as illustrated in FIG. 14, blocks corresponding to the spatial merging candidates may not include available motion information in a parallel ME, and thus may be handled as being not available. In this case, the spatial merging candidates $A_0, A_1, B_0, B_1$, and $B_2$ may be respectively replaced by MER merging candidates $A_0', A_1', B_0', B_1'$, and $B_2'$ shown in 1510 of FIG. 15. That is, the encoder and the decoder may use the MER merging candidates $A_0', A_1', B_0', B_1'$, and $B_2'$ as a merging candidate of the current PU 1515. Since a location of the MER merging candidate shown in 1510 of FIG. 15 is the same as that in the embodiment of FIG. 14 in practice, detailed descriptions thereof will be omitted.

Referring to 1520 of FIG. 15, a current PU 1525 included in the current MER 1520 may have 5 spatial merging candidates $A_0, A_1, B_0, B_1$, and $B_2$ similarly to 1510 of FIG. 15. In this case, locations of the merging candidates $A_0, A_1, B_0$, and $B_1$ may be specified or expressed by the following coordinate.

$A_0$: $(x-1, y+nPSH-1)$ $A_1$: $(x-1, y+nPSH)$ $B_0$: $(x+nPSW-1, y-1)$ $B_1$: $(x+nPSW, y-1)$

Herein, (x,y) denotes a coordinate of a pixel located in a leftmost upper portion in the current PU 1525, and the coordinate may be determined according to the leftmost upper location of the picture to which the current PU 1525 belongs. In addition, nPSH denotes a height of the current PU 1525, and nPSW denotes a width of the current PU 1525.

Meanwhile, similarly to 1510 of FIG. 15, blocks corresponding to the spatial merging candidate may not include available motion information in a parallel ME, and thus may be handled as being not available. In this case, the spatial merging candidates $A_0, A_1, B_0, B_1$, and $B_2$ may be replaced with the MER merging candidates $A_0', A_1', B_0', B_1'$, and $B_2'$ shown in 1510 of FIG. 15. That is, the encoder and the decoder may use the MER merging candidates $A_0', A_1', B_0', B_1'$, and $B_2'$ as the merging candidate of the current PU 1515.

Herein, the MER merging candidate $A_0'$ may be derived on the basis of the block $A_0'$ having the same horizontal location as the block $A_0$ among blocks adjacent to a left side of the current MER 1520, and the MER merging candidate $A_1'$ may be derived on the basis of the block $A_1'$ having the same horizontal location as the block $A_1$ among blocks adjacent to a left side of the current MER 1520. In addition, the MER merging candidate $B_1'$ may be derived on the basis of the block $B_1'$ having the same vertical location as the block $B_0$ among blocks adjacent to an upper portion of the current MER 1520, and the MER merging candidate $B_0'$ may be derived on the basis of the block $B_0'$ adjacent to a right side of the block $B_1'$. In this case, locations of the merging candidates $A_0', A_1', B_0'$, and $B_1'$ may be specified or expressed by the following coordinate.

$A_0'$: $(((x>>nMER)<<nMER)-1, y+nPSH-1)$ $A_1'$: $(((x>>nMER)<<nMER)-1, y+nPSH)$ $B_0'$: $(x+nPSW-1, ((y>>nMER)<<nMER)-1)$ $B_1'$: $(x+nPSW, ((y>>nMER)<<nMER)-1)$

Herein, nMER may denote a log value of a size (i.e., width/height) of the MER.

In addition, in 1520 of FIG. 15, the encoder and the decoder may not use the merging candidate $B_2$ by handling it as being not available, and may replace it as the MER merging candidate $B_2'$. If the MER merging candidate $B_2'$ is used as a merging candidate of the current PU 1525, the MER merging candidate $B_2'$ may be derived on the basis of a left block 1531 having the same horizontal location as the block $B_2$ among blocks adjacent to a left side of the current MER 1520 or an upper block 1533 having the same vertical location as the block $B_2$ among blocks adjacent to an upper portion of the current MER 1520. For example, the encoder and the decoder may check whether the left block 1531 is available. In this case, the encoder and the decoder may derive the MER merging candidate $B_2'$ on the basis of the left block 1531 if the left block 1531 is available, and may derive the MER merging candidate $B_2'$ on the basis of the upper block 1533 if the left block 1531 is not available.

In the embodiment of 1520 of FIG. 15, a block located closer to the current PU 1520 may be used as the merging candidate block. Thus, a coding efficiency may be improved in comparison with the embodiment of 1510 of FIG. 15.

Meanwhile, if the MER merging candidate of the current PU 1525 is derived, the encoder and the decoder may generate a merging candidate list on the basis of the derived MER merging candidate. In this case, a plurality of MER merging candidates may be added and/or inserted to the merging candidate list in a specific order. Since a smaller merge index is assigned to an MER merging candidate first added to the merging candidate list, an MER merging candidate having a high possibility of being used when deriving a motion of the current PU may be added preferentially to the merging candidate list, thereby being able to decrease an amount of information transmitted from the encoder to the decoder. For this, the encoder and the decoder may preferentially add an MER merging candidate corresponding to the block located closer to the current PU 1520 to the merging candidate list.

A horizontal distance from the current PU 1520 to the MER may be indicated by a distance from a pixel located in a leftmost upper portion in the current PU 1520 to a left boundary of the MER. In addition, a vertical distance from the current PU 1520 to the MER may be indicated by a distance from a pixel located in a leftmost upper portion in the current PU 1520 to an upper boundary of the MER. Therefore, the horizontal distance and vertical distance from the current PU 1520 to the MER may be expressed, for example, by Equation 1 below.

$$distX = x \% \ nMER$$

$$distY = y \% \ nMER \quad \text{[Equation 1]}$$

Herein, distX denotes a horizontal distance from the current PU 1520 to the MER, and distY denotes a vertical distance from the current PU 1520 to the MER. (x,y) denotes a coordinate of a pixel located in a leftmost upper portion in the current PU 1520, and nMER denotes a size of the MER.

For example, if a value of disX is less than a value of distY, since a block adjacent to a left side of the MER is closer to the current PU 1520 in comparison with a block adjacent to an upper portion of the MER, the encoder and the decoder may first add the MER merging candidates $A_1'$ and $A_0'$ to the merging candidate list before adding the MER merging candidates $B_1'$ and $B_0'$. For example, if the value of distX is less than the value of distY, the MER merging candidates may be added to the merging candidate list in the order of $A_1'$, $A_0'$, $B_1'$, and $B_0'$. Otherwise (i.e., if the value of distX is greater than or equal to the value of distY), the MER merging candidates may be added to the merging candidate list in the order of $B_1'$, $B_0'$, $A_1'$, and $A_0'$. For another example, if the value of the distX is less than the value of distY, the MER merging candidates may be added to the merging candidate list in the order of $A_1'$, $B_1'$, $A_0'$, and $B_0'$. Otherwise (i.e., if the value of the distX is greater than or equal to the value of the distY), the MER merging candidates may be added to the merging candidate list in the order of $B_1'$, $A_1'$ $B_0'$, and $A_0'$.

Figure 16:
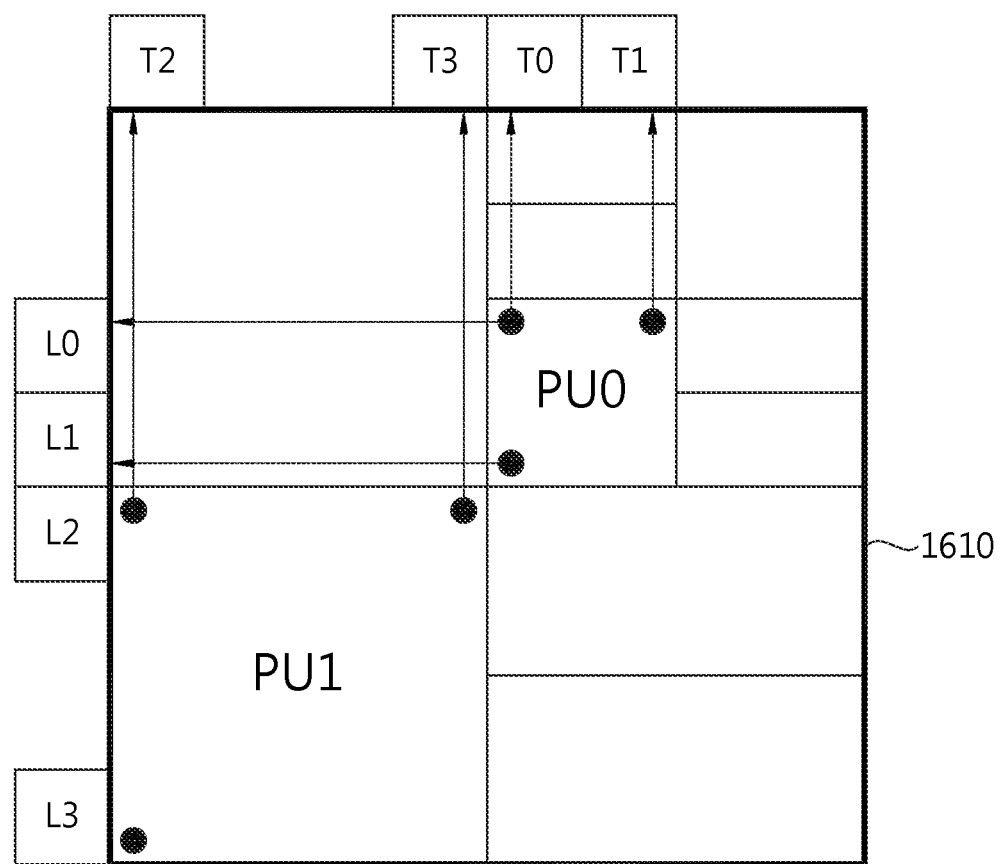
FIG. 16 is a schematic view showing another embodiment of a method of deriving an MER merging candidate.

FIG. 16 is a schematic view showing another embodiment of a method of deriving an MER merging candidate. 1610 of FIG. 16 indicates one MER.

Referring to FIG. 16, the single MER 1610 may include a plurality of PUs. Hereinafter, only for the embodiment of FIG. 16, a pixel located in a leftmost upper portion in the PU is called a left upper pixel, a pixel located in a rightmost upper portion of the PU is called a right upper pixel, and a pixel located in a leftmost lower portion in the PU is called a left lower pixel. In the embodiment of FIG. 16, four MER merging candidates may be derived for each of the plurality of PUs belonging to the MER 1610.

In FIG. 16, motion information of two blocks adjacent to an upper portion of an MER and motion information of two blocks adjacent to a left side of the MER may be used as an MER merging candidate for one PU. Herein, the two blocks adjacent to the upper portion of the MER may be respectively a block including a pixel located on the same vertical line as a left upper pixel of the PU and a block including a pixel located on the same vertical line as a right upper pixel of the PU. In addition, the two blocks adjacent to the left side of the MER may be respectively a block including a pixel located on the same horizontal line as a left upper pixel of the PU and a block including a pixel located on the same horizontal line as a left lower pixel of the PU.

Referring to FIG. 16, a PU, i.e., PU0, may use motion information of two blocks T0 and T1 adjacent to an upper portion of the MER and motion information of two blocks L0 and L1 adjacent to a left side of the MER as an MER merging candidate. Herein, the block T0 may be a block including a pixel located on the same vertical line as a left upper pixel of the PU0, and the block T1 may be a block including a pixel located on the same vertical line as a right upper pixel of the PU0. In addition, the block L0 may be a block including a pixel located on the same horizontal line as a left upper pixel of the PU0, and the block L1 may be a block including a pixel located on the same horizontal line as a left lower pixel of the PU0.

Referring again to FIG. 16, a PU, i.e., PU1, may use motion information of two blocks T2 and T3 adjacent to an upper portion of the MER and motion information of two blocks L2 and L3 adjacent to a left side of the MER as an MER merging candidate. Herein, the block T2 may be a block including a pixel located on the same vertical line as a left upper pixel of the PU1, and the block T3 may be a block including a pixel located on the same vertical line as a right upper pixel of the PU1. In addition, the block L2 may be a block including a pixel located on the same horizontal line as a left upper pixel of the PU1, and the block L3 may be a block including a pixel located on the same horizontal line as a left lower pixel of the PU1.

Figure 17:
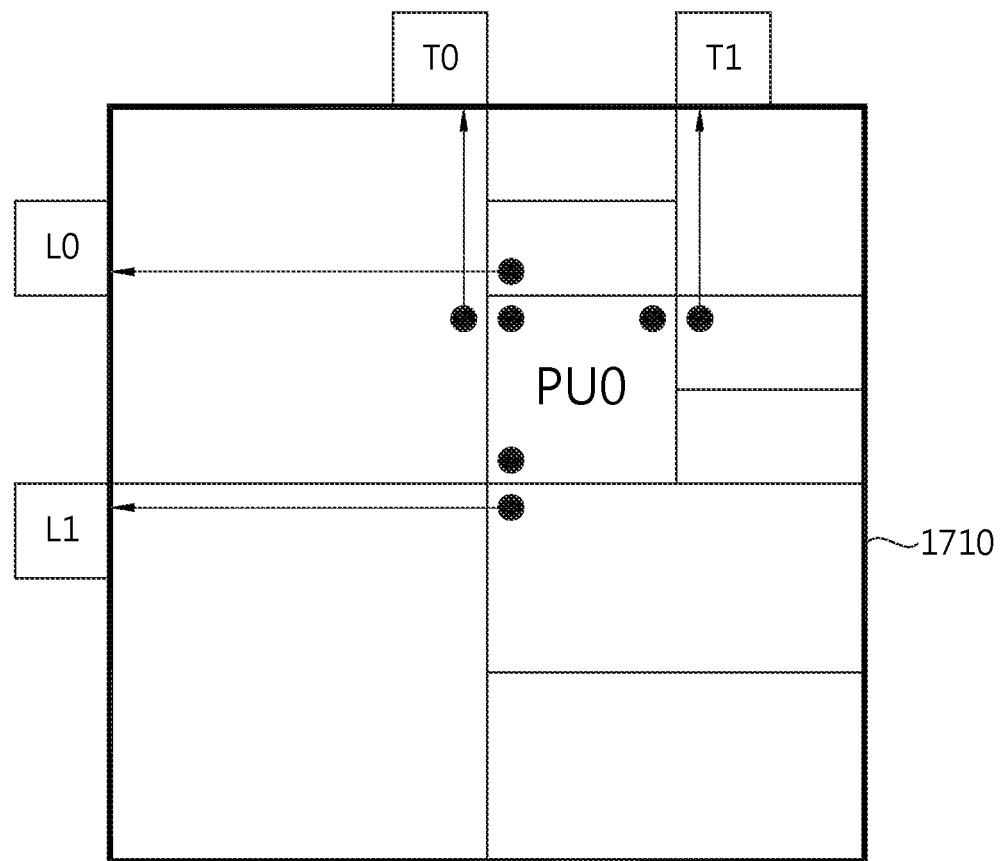
FIG. 17 is a schematic view showing another embodiment of a method of deriving an MER merging candidate.

FIG. 17 is a schematic view showing another embodiment of a method of deriving an MER merging candidate. 1710 of FIG. 17 indicates one MER.

Referring to FIG. 17, the single MER 1710 may include a plurality of PUs. Hereinafter, only for the embodiment of FIG. 17, a pixel located in a leftmost upper portion in the PU is called a left upper pixel, a pixel located in a rightmost upper portion of the PU is called a right upper pixel, and a pixel located in a leftmost lower portion in the PU is called a left lower pixel. In the embodiment of FIG. 17, similarly to the embodiment of FIG. 16, four MER merging candidates may be derived for each of the plurality of PUs belonging to the MER 1710.

In FIG. 17, motion information of two blocks adjacent to an upper portion of an MER (herein, the two blocks may be a block closest in location to a left upper corner outside each MER or a block closest in location to a right upper corner outside the MER, and hereinafter, the same applies) and motion information of two blocks adjacent to a left side of the MER (herein, the two blocks may be a block closest in location to a left upper corner outside each MER or a block closest in location to a left upper corner outside the MER, and hereinafter, the same applies) may be used as an MER merging candidate. Herein, the two blocks adjacent to the upper portion of the MER may be respectively a block including a pixel located on the same vertical line as a pixel adjacent to a left side of a left upper pixel (i.e., a pixel in the PU) and a block including a pixel located on the same vertical line as a pixel adjacent to a right side of a right upper pixel (i.e., a pixel in the PU). In addition, the two blocks adjacent to the left side of the MER may be respectively a block including a pixel located on the same vertical line as a pixel adjacent to an upper portion of a left upper pixel (i.e., a pixel in the PU) and a block including a pixel located on the same vertical line as a pixel adjacent to a lower portion of a left lower pixel (i.e., a pixel in the PU).

Referring to FIG. 17, a PU, i.e., PU0, may use motion information of two blocks T0 and T1 adjacent to an upper portion of the MER and motion information of two blocks L0 and L1 adjacent to a left side of the MER as an MER merging candidate. Herein, the block T0 may be a block including a pixel located on the same vertical line as a pixel adjacent to a left side of a left upper pixel (i.e., a pixel in the PU0). The block T1 may be a block including a pixel located on the same vertical line as a pixel adjacent to a right side of a right upper pixel (i.e., a pixel in the PU0). In addition, the block L0 may be a block including a pixel located on the same horizontal line as a pixel adjacent to an upper portion of a left upper pixel (i.e., a pixel in the PU0). The block L1 may be a block including a pixel located on the same horizontal line as a pixel adjacent to a lower portion of a left lower pixel (i.e., a pixel in the PU0).

Figure 18:
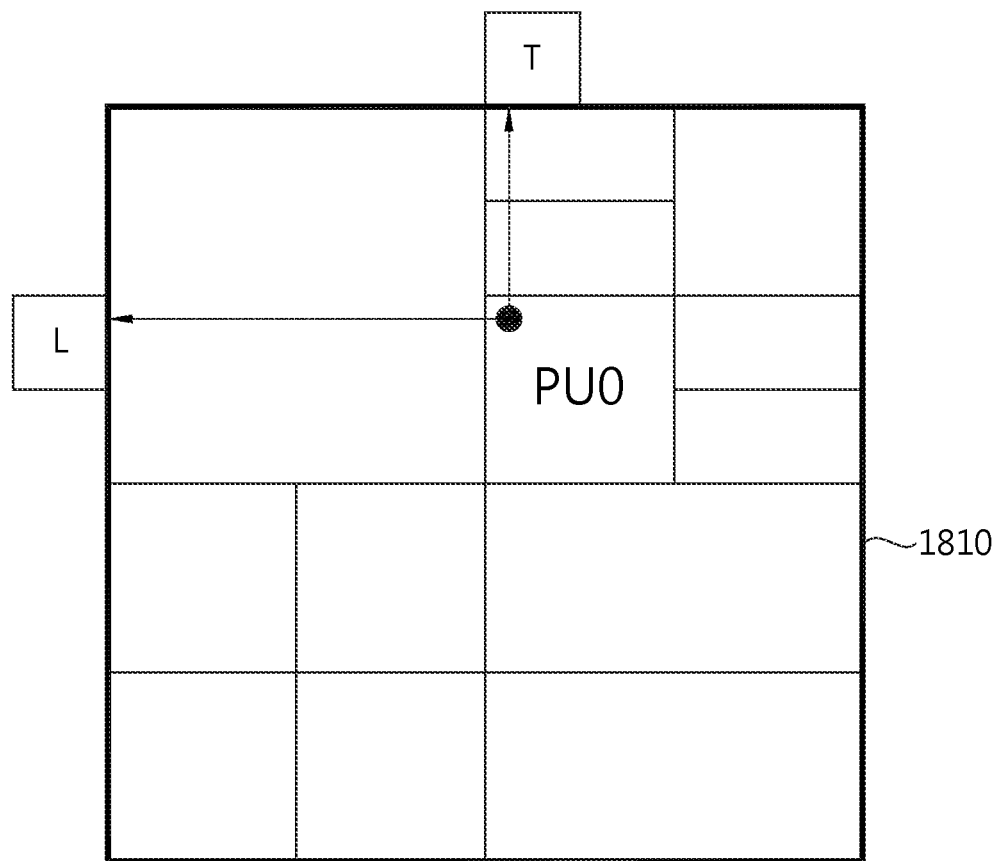
FIG. 18 is a schematic view showing another embodiment of a method of deriving an MER merging candidate.

FIG. 18 is a schematic view showing another embodiment of a method of deriving an MER merging candidate. 1810 of FIG. 18 indicates one MER.

Referring to FIG. 18, the single MER 1810 may include a plurality of PUs. Hereinafter, only for the embodiment of FIG. 18, a pixel located in a leftmost upper portion in the PU is called a left upper pixel. In the embodiment of FIG. 18, two MER merging candidates may be derived for each of the plurality of PUs belonging to the MER 1810.

In the embodiment of FIG. 18, motion information of one block adjacent to an upper portion of an MER and motion information of one block adjacent to a left side of the MER may be used as an MER merging candidate for one PU. Herein, the block adjacent to the upper portion of the MER may be a block including a pixel located on the same vertical line as a left upper pixel of the PU. In addition, the block adjacent to the left side of the MER may be a block including a pixel located on the same horizontal line as a left upper pixel of the PU.

Referring to FIG. 18, a PU, i.e., PU0, may use motion information of one block T adjacent to an upper portion of the MER and motion information of one block L adjacent to a left side of the MER as an MER merging candidate. Herein, the block T may be a block including a pixel located on the same vertical line as a left upper pixel of the PU0. In addition, the block L may be a block including a pixel located on the same horizontal line as a left upper pixel of the PU0.

Figure 19:
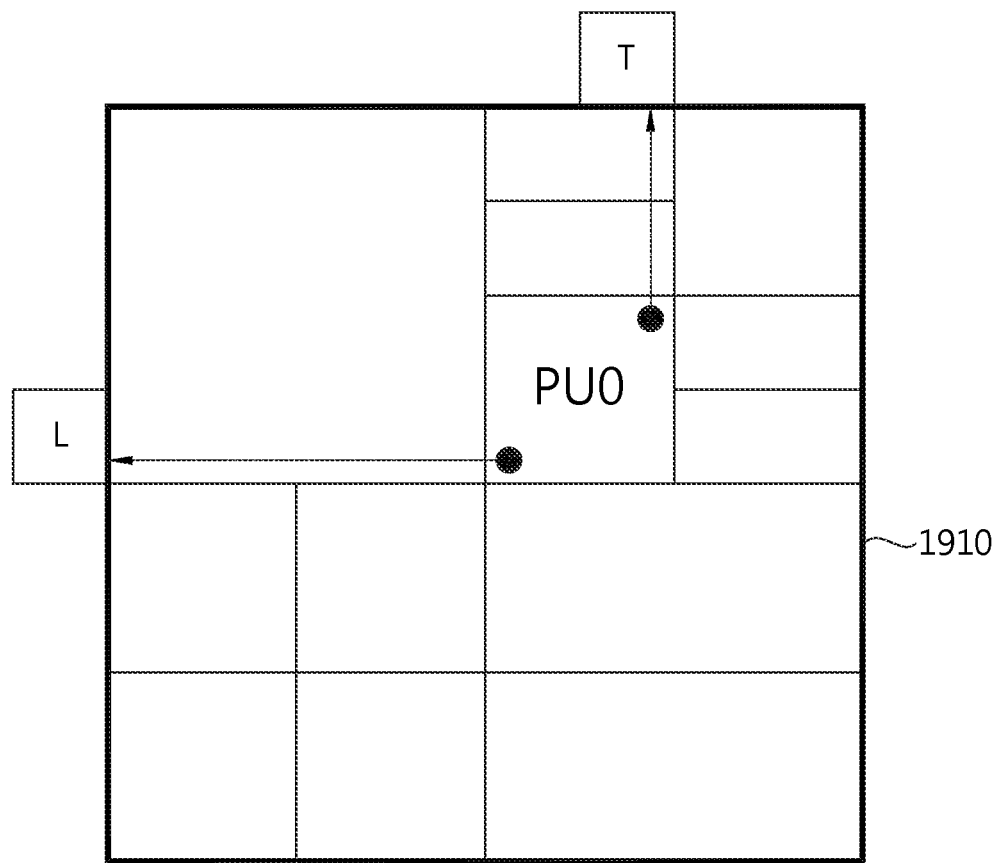
FIG. 19 is a schematic view showing another embodiment of a method of deriving an MER merging candidate.

FIG. 19 is a schematic view showing another embodiment of a method of deriving an MER merging candidate. 1910 of FIG. 19 indicates one MER.

Referring to FIG. 19, the single MER 1910 may include a plurality of PUs. Hereinafter, only for the embodiment of FIG. 19, a pixel located in a rightmost upper portion of the PU is called a right upper pixel, and a pixel located in a leftmost lower portion of the PU is called a left lower pixel. In the embodiment of FIG. 19, similarly to the embodiment of FIG. 18, two MER merging candidates may be derived for each of the plurality of PUs belonging to the MER 1910.

In the embodiment of FIG. 19, motion information of one block adjacent to an upper portion of an MER and motion information of one block adjacent to a left side of the MER may be used as an MER merging candidate for one PU. Herein, the block adjacent to the upper portion of the MER may be a block including a pixel located on the same vertical line as a right upper pixel of the PU. In addition, the block adjacent to the left side of the MER may be a block including a pixel located on the same horizontal line as a left lower pixel of the PU.

Referring to FIG. 19, a PU, i.e., PU0, may use motion information of one block T adjacent to an upper portion of the MER and motion information of one block L adjacent to a left side of the MER as an MER merging candidate. Herein, the block T may be a block including a pixel located on the same vertical line as a right upper pixel of the PU0. In addition, the block L may be a block including a pixel located on the same horizontal line as a left lower pixel of the PU0.

Figure 20:
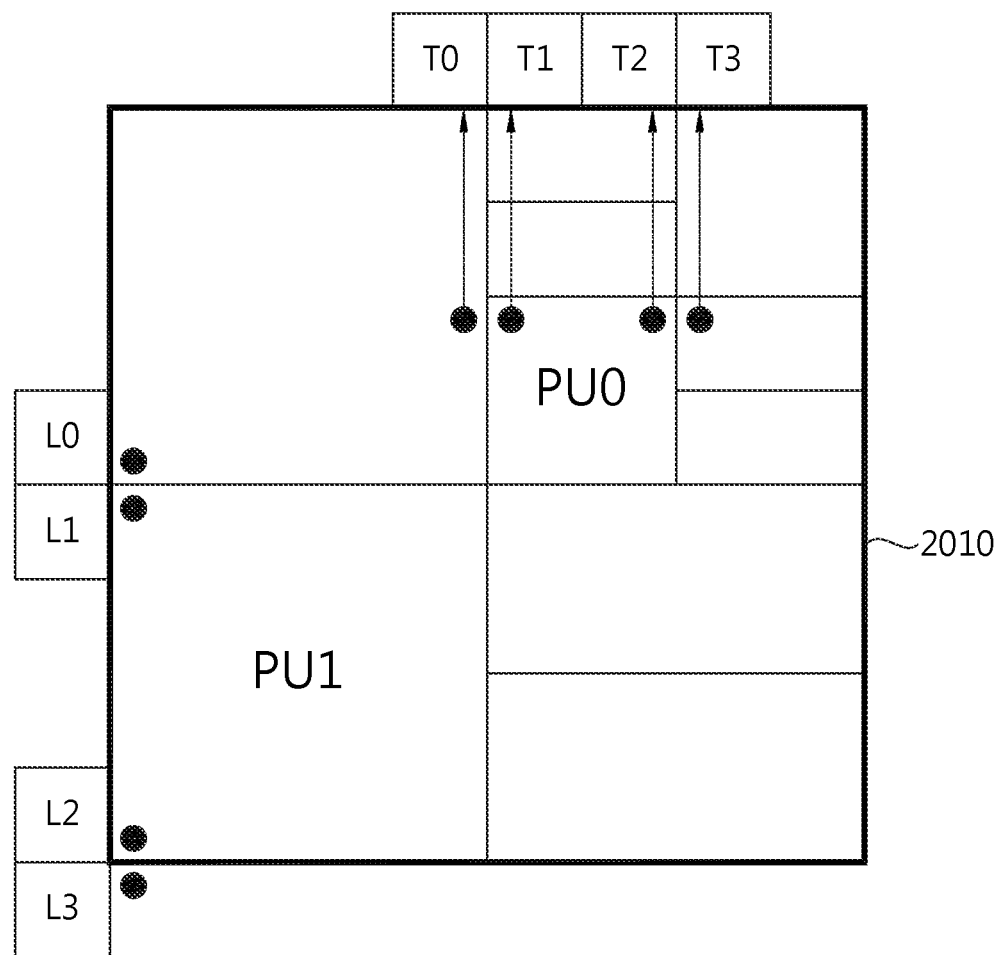
FIG. 20 is a schematic view showing another embodiment of a method of deriving an MER merging candidate.

FIG. 20 is a schematic view showing another embodiment of a method of deriving an MER merging candidate. 2010 of FIG. 20 indicates one MER.

Referring to FIG. 20, the single MER 2010 may include a plurality of PUs. Hereinafter, only for the embodiment of FIG. 20, a pixel located in a leftmost upper portion in the PU is called a left upper pixel, a pixel located in a rightmost upper portion of the PU is called a right upper pixel, and a pixel located in a leftmost lower portion in the PU is called a left lower pixel. In the embodiment of FIG. 20, four MER merging candidates may be derived for each of the plurality of PUs belonging to the MER 2010.

In FIG. 20, an MER merging candidate of the PU may be derived on the basis of a location of a PU in an MER. That is, the MER merging candidate of the PU may be derived on the basis of a horizontal distance and vertical distance from the PU to the MER. Herein, the horizontal distance from the PU to the MER may imply a distance from a left upper pixel of the PU to a left boundary of the MER. In addition, the vertical distance from the PU to the MER may imply a distance from a left upper pixel of the PU to an upper boundary of the MER.

For example, if the horizontal distance from the PU to the MER is closer than the vertical distance, motion information of four blocks adjacent to a left side of the MER (herein, among the four blocks, two blocks may be respectively a block closest in location to a left upper corner outside the MER and a block closet in location to a left lower corner outside the MER, and hereinafter the same applies) may be used as an MER merging candidate of the PU. The four blocks adjacent to the left side of the MER may be respectively a block including a pixel located on the same horizontal line as a pixel adjacent to an upper portion of a left upper pixel (i.e., a pixel in the PU), a block including a pixel located on the same horizontal line as a left upper pixel (i.e., a pixel in the PU), a block including a pixel located on the same horizontal line as a left lower pixel (i.e., a pixel in the PU), and a block including a pixel located on the same horizontal line as a pixel adjacent to a lower portion of a left lower pixel (i.e., a pixel in the PU).

Otherwise, motion information of the four blocks adjacent to an upper portion of the MER (herein, among the four blocks, two blocks may be respectively a block closest in location to a left upper corner outside the MER and a block closest in location to a right upper corner outside the MER) may be used as an MER merging candidate of the PU. Herein, the four blocks adjacent to an upper portion of the MER may be respectively a block including a pixel located on the same vertical line as a pixel adjacent to a left side of a left upper pixel (i.e., a pixel in the PU), a block including a pixel located on the same vertical line as a left upper pixel (i.e., a pixel in the PU), a block located on the same vertical line as a right upper pixel (i.e., a pixel in the PU), and a block including a pixel located on the same vertical line as a pixel adjacent to a right side of a right upper pixel (i.e., a pixel in the PU).

Referring to FIG. 20, regarding a PU0, a vertical distance to the MER may be closer than a horizontal distance. Therefore, the PU0 may use motion information of four blocks T0, T1, T2, and T3 adjacent to an upper portion of the MER as an MER merging candidate. Herein, the block T0 may be a block including a pixel located on the same vertical line as a pixel adjacent to a left side of a left upper pixel (i.e., a pixel in the PU0). The block T1 may be a block including a pixel located on the same vertical line as a left upper pixel (i.e., a pixel in the PU0). In addition, the block T2 may be a block including a pixel located on the same vertical line as a right upper pixel (i.e., a pixel in the PU0). The block T3 may be a block including a pixel located on the same vertical line as a pixel adjacent to a right side of a right upper pixel (i.e., a pixel in the PU0).

Referring again to FIG. 20, regarding a PU1, a horizontal distance to the MER may be closer than a vertical distance. Therefore, the PU1 may use motion information of four blocks L0, L1, L2, and L3 adjacent to a left side of the MER as an MER merging candidate. Herein, the block L0 may be a block including a pixel located on the same vertical line as a pixel adjacent to an upper portion of a left upper pixel (i.e., a pixel in the PU1). The block L1 may be a block including a pixel located on the same vertical line as a left upper pixel (i.e., a pixel in the PU1). In addition, the block L2 may be a block including a pixel located on the same vertical line a left lower pixel (i.e., a pixel in the PU1). The block L3 may be a block including a pixel located on the same vertical line as a pixel adjacent to a lower portion of a left lower pixel (i.e., a pixel in the PU1).

Figure 21:
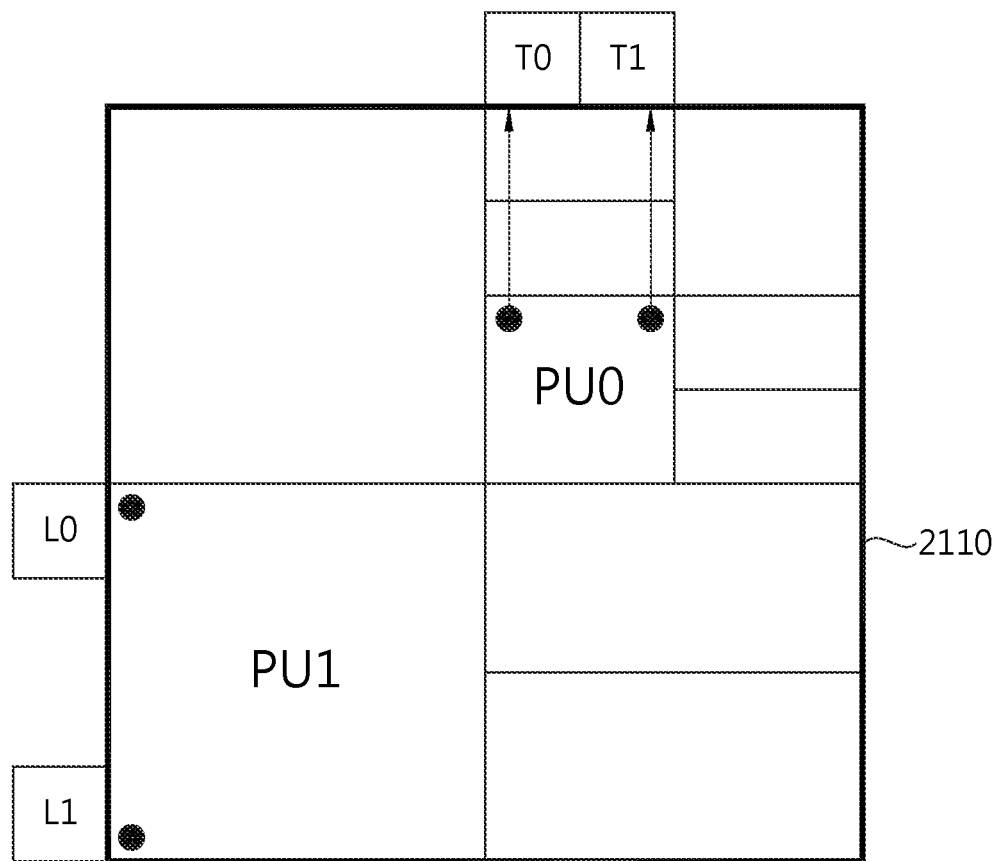
FIG. 21 is a schematic view showing another embodiment of a method of deriving an MER merging candidate.

FIG. 21 is a schematic view showing another embodiment of a method of deriving an MER merging candidate. 2110 of FIG. 21 indicates one MER.

Referring to FIG. 21, the single MER 2110 may include a plurality of PUs. Hereinafter, only for the embodiment of FIG. 21, a pixel located in a leftmost upper portion in the PU is called a left upper pixel, a pixel located in a rightmost upper portion of the PU is called a right upper pixel, and a pixel located in a leftmost lower portion in the PU is called a left lower pixel. In the embodiment of FIG. 21, two MER merging candidates may be derived for each of the plurality of PUs belonging to the MER 2110.

In FIG. 21, an MER merging candidate of the PU may be derived on the basis of a location of a PU in an MER. That is, the MER merging candidate of the PU may be derived on the basis of a horizontal distance and vertical distance from the PU to the MER. Herein, the horizontal distance from the PU to the MER may imply a distance from a left upper pixel of the PU to a left boundary of the MER. In addition, the vertical distance from the PU to the MER may imply a distance from a left upper pixel of the PU to an upper boundary of the MER.

For example, if the horizontal distance from the PU to the MER is closer than the vertical distance, motion information of two blocks adjacent to a left side of the MER (herein, the two blocks may be respectively a block closest in location to a left upper corner outside the MER and a block closest in location to a left lower corner outside the MER, and hereinafter the same applies) may be used as an MER merging candidate of the PU. The two blocks adjacent to the left side of the MER may be respectively a block including a pixel located on the same horizontal line as a left upper pixel (i.e., a pixel in the PU) and a block including a pixel located on the same horizontal line as a left lower pixel of the PU.

Otherwise, motion information of the two blocks adjacent to an upper portion of the MER (herein, the two blocks may be respectively a block closest in location to a left upper corner outside the MER and a block closest in location to a right upper corner outside the MER) may be used as an MER merging candidate of the PU. Herein, the two blocks adjacent to an upper portion of the MER may be respectively a block including a pixel located on the same vertical line as a left upper pixel of the PU and a block located on the same vertical line as a right upper pixel of the PU.

Referring to FIG. 21, regarding a PU0, a vertical distance to the MER may be closer than a horizontal distance. Therefore, the PU0 may use motion information of two blocks T0 and T1 adjacent to an upper portion of the MER as an MER merging candidate. Herein, the block T0 may be a block including a pixel located on the same vertical line as a left upper pixel of the PU0. In addition, the block T1 may be a block including a pixel located on the same vertical line as a right upper pixel of the PU0.

Referring again to FIG. 21, regarding a PU1, a horizontal distance to the MER may be closer than a vertical distance. Therefore, the PU1 may use motion information of two blocks L0 and L1 adjacent to a left side of the MER as an MER merging candidate. Herein, the block L0 may be a block including a pixel located on the same vertical line as a left upper pixel of the PU1. In addition, the block L1 may be a block including a pixel located on the same vertical line as a left lower pixel of the PU1.

Figure 22:
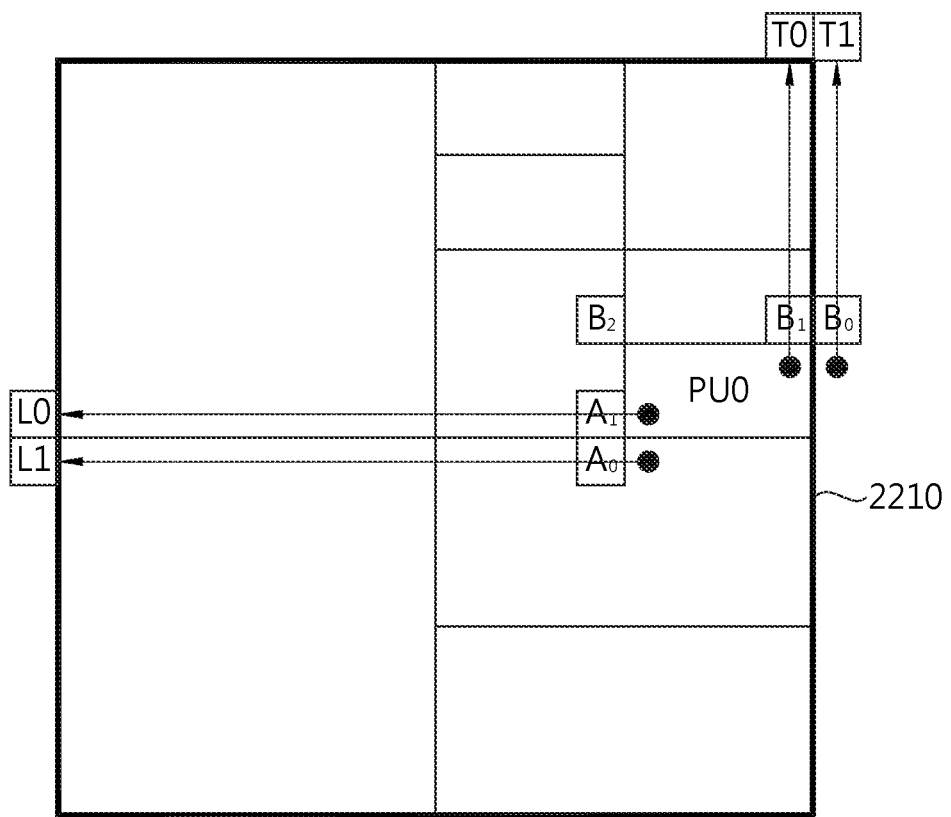
FIG. 22 is a schematic view showing another embodiment of a method of deriving an MER merging candidate.

FIG. 22 is a schematic view showing another embodiment of a method of deriving an MER merging candidate. 2210 of FIG. 22 indicates one MER.

Referring to FIG. 22, the single MER 2210 may include a plurality of PUs. Hereinafter, only for the embodiment of FIG. 22, a pixel located in a rightmost upper portion of the PU is called a right upper pixel, and a pixel located in a leftmost lower portion of the PU is called a left lower pixel.

Referring again to FIG. 22, the PU0 may have five spatial merging candidates $A_0$, $A_1$, $B_0$, $B_1$, and $B_2$. However, as described above, the spatial merging candidate may be not available in a parallel ME in a merge mode and/or a skip mode. For example, if a block used as a merging candidate is included in the same MER as the PU0, since the block corresponds to a block for which encoding/decoding is not complete in an ME, the block cannot be used in the parallel ME. In addition, the block used as the merging candidate may be in a state in which encoding and/or decoding is not complete in a parallel ME of the PU0 according to a encoding/decoding order.

Meanwhile, in the embodiment of FIG. 22, regarding the PU0 belonging to the MER 2210, up to four MER merging candidates may be derived. The four MER merging candidates may be motion information of two blocks T0 and T1 adjacent to an upper portion of the MER (herein, one of the two blocks may be a block closest in location to a right upper corner outside the MER, and hereinafter the same applies) and motion information of two blocks L0 and L1 adjacent to a left side of the MER (herein, one of the two blocks may be a block closest in location to a left lower corner outside the MER, and hereinafter the same applies). Herein, two blocks adjacent to an upper portion of the MER may be respectively a block T0 located on the same vertical line as a right upper pixel (i.e., a pixel in the PU0) and a block T1 including a pixel located on the same vertical line as a pixel adjacent to a right side of a right upper pixel (i.e., a pixel in the PU0). In addition, two blocks adjacent to a left side of the MER may be respectively a block L0 located on the same vertical line as a left lower pixel (i.e., a pixel in the PU0) and a block L1 including a pixel located on the same vertical line as a pixel adjacent to a lower portion of a left lower pixel (i.e., a pixel in the PU0).

In this case, only for a merging candidate which is not available among merging candidates $A_0$, $A_1$, $B_0$, and $B_1$ of the PU0, the encoder and the decoder may derive an MER merging candidate corresponding thereto. Whether each spatial merging candidate of the PU in the MER is available in a parallel ME is determined according to a location of the PU, and thus, in this case, it can be regarded that an MER merging candidate derived for the PU0 is determined on the basis of a location of the PU.

Referring to FIG. 22, if a merging candidate $A_1$ of the PU0 is not available in a parallel merge mode/parallel skip mode ME, motion information of the block L0 may be used as an MER merging candidate of the PU0. In addition, if a merging candidate $A_0$ of the PU0 is not available in the parallel merge mode/parallel skip mode ME, motion information of the block L1 may be used as an MER merging candidate of the PU0. In addition, if a merging candidate $B_1$ of the PU0 is not available in the parallel merge mode/parallel skip mode ME, motion information of the block T0 may be used as an MER merging candidate of the PU0, and if a merging candidate $B_0$ of the PU0 is not available in the parallel merge mode/parallel skip mode ME, motion information of the block T1 may be used as an MER merging candidate of the PU0.

Figure 23:
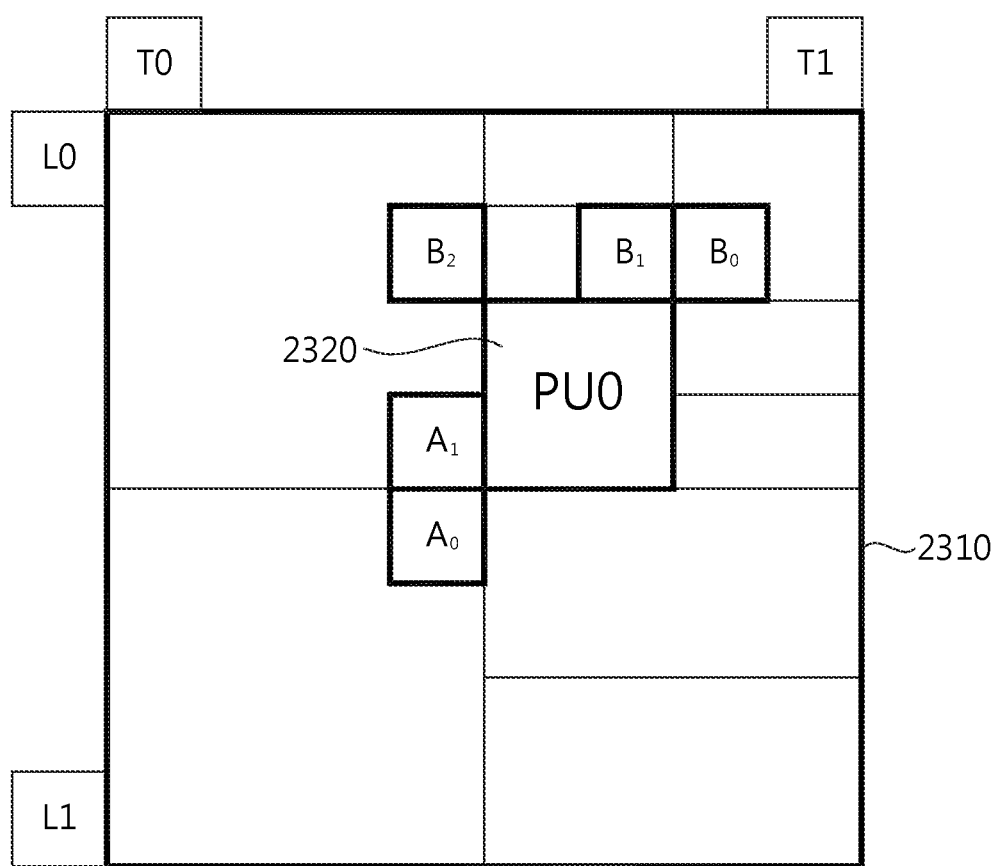
FIG. 23 is a schematic view showing another embodiment of a method of deriving an MER merging candidate.

FIG. 23 is a schematic view showing another embodiment of a method of deriving an MER merging candidate. 2310 of FIG. 23 indicates one MER.

Referring to FIG. 23, a PU0 2320 included in the MER 2310 may have five spatial merging candidates $A_0$, $A_1$, $B_0$, $B_1$, and $B_2$. In addition, although not shown in FIG. 23, as described above with reference to FIG. 7, the PU0 2320 may have a temporal merging candidate.

As described above with reference to FIG. 22, a spatial merging candidate of any PU in the MER may be not available in a parallel ME in a merge mode and/or a skip mode. In the embodiment of FIG. 23, since all blocks used to derive a spatial merging candidate of the PU0 2320 are included in the same MER as the PU0 2320, spatial merging candidates of the PU0 2320 are handled as being not available, and thus may not be included in the merging candidate list.

Meanwhile, the number of merging candidates constituting the merging candidate list as described above may be limited to a specific fixed number. In the embodiment of FIG. 23, for convenience of explanation, it is assumed that the number of merging candidates constituting the merging candidate list is limited to 5. In this case, the number of available merging candidates (i.e., a spatial merging candidate and a temporal merging candidate) derived for a PU may be less the 5 due to the aforementioned reason, and even if available spatial merge and temporal merging candidates are added to the merging candidate list, the merging candidate list may not be completely filled. In this case, after the temporal merging candidate is added to the merging candidate list, the encoder and the decoder may derive an MER merging candidate to additionally add it to the merging candidate list in a specific order, thereby allowing the number of merging candidates constituting the merging candidate list to be 5. That is, the encoder and the decoder may add or insert MER merging candidates to the merging candidate list until the number of merging candidates constituting the merging candidate list is 5.

Referring to FIG. 23, motion information of blocks L0, L1, T0, and T1 may be used as an MER merging candidate additionally inserted to a merging candidate list of the PU0 2320. Herein, the block L0 may be a block located in an uppermost portion among blocks adjacent to a left side of the MER, and the block L1 may be a block located in a lowermost portion among blocks adjacent to a left side of the MER. In addition, the block T0 may be a block located in a leftmost portion among blocks adjacent to an upper portion of the MER, and the block T1 may be a block located in a rightmost portion among blocks adjacent to an upper portion of the MER.

In order to allow the number of merging candidates constituting the merging candidate list to be 5, the number of MER merging candidates additionally inserted to the merging candidate list may be variable according to a location of the PU or the like. Therefore, an order of inserting the aforementioned MER merging candidate to the merging candidate list may be predetermined. For example, the encoder and the decoder may additionally add the MER merging candidates to the merging candidate list in the order of an MER merging candidate corresponding to the block L1, an MER merging candidate corresponding to the block T1, an MER merging candidate corresponding to the block L0, and an MER merging candidate corresponding to the block T0.

Figure 24:
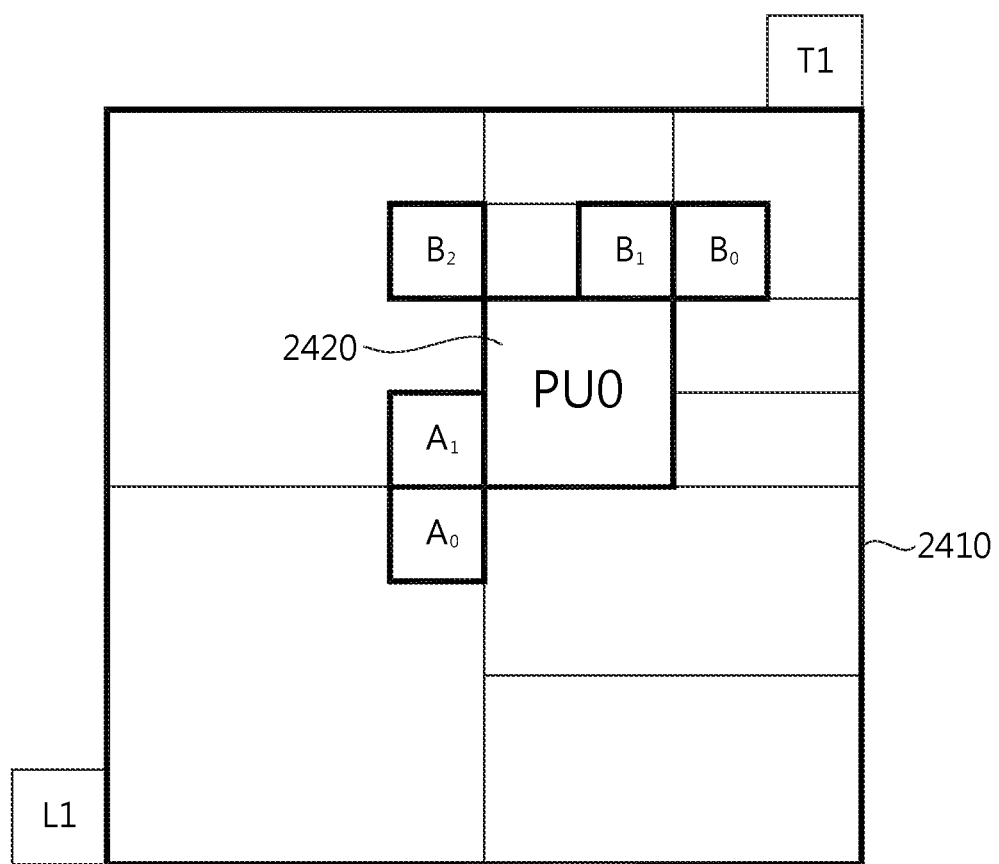
FIG. 24 is a schematic view showing another embodiment of a method of deriving an MER merging candidate.

FIG. 24 is a schematic view showing another embodiment of a method of deriving an MER merging candidate. 2410 of FIG. 24 indicates one MER.

Referring to FIG. 24, a PU0 2420 included in the MER 2410 may have five spatial merging candidates $A_0$, $A_1$, $B_0$, $B_1$, and $B_2$. In addition, although not shown in FIG. 24, as described above with reference to FIG. 7, the PU0 2420 may have a temporal merging candidate. However, as described above with reference to FIG. 23, a spatial merging candidate of any PU in the MER may be handled as being not available in a parallel ME in a merge mode and/or a skip mode, and thus may not be included in the merging candidate list.

In this case, the encoder and the decoder may additionally add the MER merging candidates to the merging candidate list in the same manner as the embodiment of FIG. 23. For example, if the number of merging candidates constituting the merging candidate list is limited to 5, the encoder and the decoder may add or insert the MER merging candidate to the merging candidate list until the number of merging candidates is 5.

Referring to FIG. 24, motion information of blocks L1 and T1 may be used as an MER merging candidate additionally added to the merging candidate list of the PU0 2420. Herein, the block L1 may be a block located in a lowermost portion among blocks adjacent to a left side of the MER. In addition, the block T1 may be a block located in a rightmost portion among blocks adjacent to an upper portion of the MER.

In addition, as described above with reference to FIG. 23, the number of MER merging candidates additionally inserted to the merging candidate list may be variable according to a location of the PU or the like. Therefore, in the embodiment of FIG. 24, an order of inserting the aforementioned MER merging candidate to the merging candidate list may be predetermined. For example, the encoder and the decoder may additionally insert the MER merging candidates to the merging candidate list in the order of an MER merging candidate corresponding to the block L1 and an MER merging candidate corresponding to the block T1.

Meanwhile, if a common merging candidate and/or an MER merging candidate are derived for one PU as in the aforementioned embodiments of FIG. 13 to FIG. 24, the derived common merging candidate and/or MER merging candidate may be added or inserted to the merging candidate list of the PU. Hereinafter, in the following embodiments, for convenience of explanation, the common merging candidate and MER merging candidate are collectively called a parallel merging candidate.

If the parallel merging candidate is not applied, the spatial merging candidate of the PU may be, as described above with reference to FIG. 7, derived from a block adjacent to the PU and a block closest in location to an outer corner of a current block. In addition, a temporal merging candidate of the PU may be derived from a col block included in a reference picture. Hereinafter, a merging candidate used for the PU when the parallel merging candidate is not applied as in the embodiment of FIG. 7 is called a PU merging candidate.

As described above, a merging candidate included in the same MER as the PU may exist among spatial candidates corresponding to a PU merging candidate of one PU. In this case, the merging candidate included in the same MER as the PU may not include available motion information in a parallel ME. Therefore, the number of available PU merging candidates derived for the PU may be less than the number of merging candidates required to construct a merging candidate list. Herein, the number of merging candidates required to construct the merging candidate list may be a predetermined value. For example, the number of merging candidates constituting the merging candidate list may be 5.

In this case, the encoder and the decoder may additionally insert a parallel merging candidate to the merging candidate list in a specific order. In this case, the parallel merging candidate additionally inserted to the merging candidate list may be located after an available PU merging candidate in the merging candidate list. That is, the merging candidate may be inserted to the merging candidate list in an order of the parallel merging candidate.

For example, it is assumed that the PU merging candidate as shown in 720 of FIG. 7 is applied to a current PU. In this case, the encoder and the decoder may use motion information of a block $A_0$ closest in location to a left lower corner outside the current PU, a block $A_1$ located in a lowermost portion among blocks adjacent to a left side of the current PU, a block $B_0$ closest in location to a right upper corner outside the current PU, a block $B_1$ located in a rightmost portion among blocks adjacent to an upper portion of the current PU, a block $B_2$ closest in location to a left upper corner outside the current PU, and a block COL as a PU merging candidate of the current PU. In this case, for example, the PU merging candidates may be added and/or inserted to the merging candidate list in the order of $A_1$, $B_1$, $B_0$, $A_0$, $B_2$, and COL.

However, if the current PU exists inside the MER, spatial merging candidates $A_1$, $B_1$, $B_0$, $A_0$, and $B_2$ corresponding to the PU merging candidate may be not available when performing a merge mode and/or skip mode parallel ME. In this case, only a temporal merging candidate COL corresponding to the PU merging candidate may be added to the merging candidate list.

In this case, the encoder and the decoder may insert parallel merging candidates after a PU merging candidate added to the merging candidate list. For example, parallel merging candidates derived for the current PU are respectively called $A_1'$, $B_1'$, $B_0'$, $A_0'$, and $B_2'$. In this case, a temporal merging candidate corresponding to a PU merging candidate and parallel merging candidates may be added and/or inserted to the merging candidate list in the order of COL, $A_1'$, $B_1'$, $B_0'$, $A_0'$, and $B_2'$. In this case, the encoder and the decoder may add a parallel merging candidate until the number of merging candidates constituting the merging candidate list is a maximum number (e.g., 5).

Meanwhile, even if an available PU merging candidate and an available parallel merging candidate are added to the merging candidate list, there may be a case where the merging candidate list is not completely filled. In this case, the encoder and the decoder may derive a new merging candidate on the basis of a merging candidate already added to the merging candidate list and may add it to the merging candidate list. In this case, the encoder may use not only the PU merging candidate but also the parallel merging candidate to derive the new merging candidate.

Examples of the new merging candidate derived on the basis of the merging candidate already added to the merging candidate list may include a combined bi-predictive candidate (CB), a non-scaled bi-predictive candidate, and/or a zero motion candidate (Zero), etc. Herein, the CB may be derived on the basis of two merging candidates among merging candidates already added to the merging candidate list. For example, L0 motion information of the CB may be derived on the basis of one of the two merging candidates, and L1 motion information of the CB may be derived on the basis of the other of the two merging candidates. That is, the CB may be derived by combining the motion information of each of the two merging candidates. In addition, L0 motion information and L1 motion information of the NB may be derived through a specific condition and operation on the basis of one merging candidate among merging candidates already added to the merging candidate list. In addition, the Zero may imply motion information including a zero vector (0,0).

The merging candidates CB, NB, and Zero newly derived and additionally inserted to the merging candidate list may be located after an available PU merging candidate and available parallel merging candidate in a merging candidate list. That is, the merging candidate may be inserted to the merging candidate list in the order of a PU merging candidate, a parallel merging candidate, and the CB, NB, and Zero derived on the basis of the PU merging candidate and the parallel merging candidate. For example, if it is assumed that three CBs, i.e., CB0, CB1, and CB2, one NB, i.e., NB0, and one Zero are derived for one PU, merging candidates may be added and/or inserted to the merging candidate list in the order of COL, $A_1'$, $B_1'$, $B_0'$, $A_0'$, $B_2'$, $CB_0$, $CB_1$, $CB_2$, $NB_0$, and Zero. In this case, the encoder and the decoder may add a parallel merging candidate until the number of merging candidates constituting the merging candidate list is a maximum number (e.g., 5).

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. An image decoding method performed by a decoding apparatus, the method comprising:
  receiving information on a parallel merge level which represents a size of a parallel merging unit region;
  obtaining merge flag information which represents whether a merge mode is applied to a current block;
  deriving spatial merging candidates for the current block based on the merge flag information indicating that the merge mode is applied to the current block;
  constructing a merging candidate list including the spatial merging candidates for the current block;
  deriving motion information of the current block based on one of the spatial merging candidates in the merging candidate list;
  deriving prediction samples of the current block based on the derived motion information; and
  generating a reconstructed picture based on the prediction samples,
  wherein the size of the parallel merging unit region is derived based on the information on the parallel merge level,
  wherein the current block belongs to the parallel merging unit region,
  wherein the current block is related to a prediction unit (PU), and the PU is one of PUs partitioned from a coding unit (CU),
  wherein for the PU, having a size smaller than the size of the parallel merging unit region and located within the parallel merging unit region, the spatial merging candidates are identical to spatial merging candidates of a 2N×2N PU which has a same size as the parallel merging unit region,
  wherein the spatial merging candidates of the 2N×2N PU which has the same size as the parallel merging unit region, are derived from a lower left corner neighboring block, a left neighboring block, an upper right corner neighboring block, an upper neighboring block and an upper left corner neighboring block of the parallel merging unit region, and
  wherein the information on the parallel merge level is received through a picture parameter set.

2. The method of claim 1, wherein based on a value of the information on the parallel merge level being 0, the size of the parallel merging unit region is 4×4.

3. The method of claim 1, wherein based on the value of the information on the parallel merge level being greater than 0, motion information for each of the PUs contained in the parallel merging unit region can be derived in parallel.

4. The method of claim 1, wherein based on a value of the information on the parallel merge level being 1, the size of the parallel merging unit region is 8×8, and
  wherein based on a value of the information on the parallel merge level being 2, the size of the parallel merging unit region is 16×16.

5. The method of claim 1, wherein based on a value of the information on the parallel merge level being 3, the size of the parallel merging unit region is 32×32, and
  wherein based on a value of the information on the parallel merge level being 4, the size of the parallel merging unit region is 64×64.

6. The method of claim 1, wherein based on the size of the CU being 8×8 and the size of the parallel merging unit region being larger than 4×4, the PUs share the spatial merging candidates.

7. An image encoding method performed by an encoding apparatus, the method comprising:
  generating merge flag information based on whether a merge mode is applied to a current block;
  deriving spatial merging candidates for a current block based on the merge flag information indicating that the merge mode is applied to the current block;
  constructing a merging candidate list including the spatial merging candidates for the current block;
  selecting a merging candidate from the merging candidate list;
  generating merge index information for indicating the selected merging candidate from the merging candidate list;
  deriving a parallel merge level which represents a size of a parallel merging unit region;
  generating information on the parallel merge level; and
  encoding image information including the merge flag information, the merge index information and the information on the parallel merge level,
  wherein the size of the parallel merging unit region is represented based on the information on the parallel merge level,
  wherein the current block belongs to the parallel merging unit region,
  wherein the current block is related to a prediction unit (PU), and the PU is one of PUs partitioned from a coding unit (CU),
  wherein for the PU, having a size smaller than the size of the parallel merging unit region and located within the parallel merging unit region, the spatial merging candidates are identical to spatial merging candidates of a 2N×2N PU which has a same size as the parallel merging unit region,
  wherein the spatial merging candidates of the 2N×2N PU which has the same size as the parallel merging unit region, are derived from a lower left corner neighboring block, a left neighboring block, an upper right corner neighboring block, an upper neighboring block and an upper left corner neighboring block of the parallel merging unit region, and
  wherein the information on the parallel merge level is signaled through a picture parameter set.

8. A non-transitory computer-readable storage medium storing encoded image information generated by a method, the method comprising:
  generating merge flag information based on whether a merge mode is applied to a current block;
  deriving spatial merging candidates for a current block based on the merge flag information indicating that the merge mode is applied to the current block;
  constructing a merging candidate list including the spatial merging candidates for the current block;

selecting a merging candidate from the merging candidate list;
generating merge index information for indicating the selected merging candidate from the merging candidate list;
deriving a parallel merge level which represents a size of a parallel merging unit region;
generating information on the parallel merge level; and
encoding image information including the merge flag information, the merge index information and the information on the parallel merge level,
wherein the size of the parallel merging unit region is represented based on the information on the parallel merge level,
wherein the current block belongs to the parallel merging unit region,
wherein the current block is related to a prediction unit (PU), and the PU is one of PUs partitioned from a coding unit (CU),
wherein for the PU, having a size smaller than the size of the parallel merging unit region and located within the parallel merging unit region, the spatial merging candidates are identical to spatial merging candidates of a 2N×2N PU which has a same size as the parallel merging unit region,
wherein the spatial merging candidates of the 2N×2N PU which has the same size as the parallel merging unit region, are derived from a lower left corner neighboring block, a left neighboring block, an upper right corner neighboring block, an upper neighboring block and an upper left corner neighboring block of the parallel merging unit region, and
wherein the information on the parallel merge level is signaled through a picture parameter set.

* * * * *